US012361907B2

(12) United States Patent
Tsuchi

(10) Patent No.: US 12,361,907 B2
(45) Date of Patent: Jul. 15, 2025

(54) DIGITAL-TO-ANALOG CONVERTER, DATA DRIVER, AND DISPLAY DEVICE

(71) Applicant: LAPIS Technology Co., Ltd., Yokohama (JP)

(72) Inventor: Hiroshi Tsuchi, Yokohama (JP)

(73) Assignee: LAPIS Technology Co., Ltd., Yokohama (JP)

( * ) Notice: Subject to any disclaimer, the term of this patent is extended or adjusted under 35 U.S.C. 154(b) by 0 days.

(21) Appl. No.: 18/601,529

(22) Filed: Mar. 11, 2024

(65) Prior Publication Data

US 2024/0312428 A1 Sep. 19, 2024

(51) Int. Cl.
*G09G 3/36* (2006.01)
*G09G 3/3275* (2016.01)

(52) U.S. Cl.
CPC ......... *G09G 3/3688* (2013.01); *G09G 3/3275* (2013.01); *G09G 2300/0828* (2013.01); *G09G 2300/0838* (2013.01); *G09G 2310/027* (2013.01); *G09G 2310/0286* (2013.01); *G09G 2310/0291* (2013.01)

(58) Field of Classification Search
CPC ............... G09G 3/3688; G09G 3/3275; G09G 2300/0828; G09G 2300/0838; G09G 2310/027; G09G 2310/0286; G09G 2310/0291
See application file for complete search history.

(56) References Cited

U.S. PATENT DOCUMENTS

2006/0028274 A1* 2/2006 Ishii .......................... H03F 3/72 330/253
2006/0132344 A1* 6/2006 Ishii ........................ H03M 1/76 341/144
2024/0259033 A1* 8/2024 Tsuchi .................. H03M 1/765

FOREIGN PATENT DOCUMENTS

JP 2002043944 A 2/2002

* cited by examiner

*Primary Examiner* — Afroza Chowdhury
(74) *Attorney, Agent, or Firm* — VOLENTINE, WHITT & FRANCOS, PLLC

(57) ABSTRACT

The disclosure includes a differential amplifier and a first decoder that distributes and supplies a first or a second voltage to each of a plurality of input terminals based on digital data. The differential amplifier includes a Kth-power of 2 pieces of differential pairs each driven by an individually received tail current, and a tail current control circuit that individually supplies the tail current to the Kth-power of 2 pieces of the differential pairs. The tail current control circuit sets a current ratio of the tail current flowing through of two respective differential pairs among the Kth-power of 2 pieces of the differential pairs to be larger than a current ratio of the tail current flowing through other respective differential pairs excluding the two differential pairs.

11 Claims, 25 Drawing Sheets

Vout=(m<1>V<1>+m<2>V<2>+···+m<2^K>V<2^K>)/(m<1>+m<2>+···+m<2^K>)

| DIGITAL DATA DT | | | | | | | | | | |
|---|---|---|---|---|---|---|---|---|---|---|
| D(K-1) | — | 0 | 0 | 0 | 0 | · · · | 1 | 1 | 1 | 1 |
| ⋮ | — | ⋮ | ⋮ | ⋮ | ⋮ | · · · | ⋮ | ⋮ | ⋮ | ⋮ |
| D1 | — | 0 | 0 | 1 | 1 | · · · | 0 | 0 | 1 | 1 |
| D0 | — | 0 | 1 | 0 | 1 | · · · | 0 | 1 | 0 | 1 |
| NON-INVERTING INPUT TERMINAL INPUT VOLTAGE | | | | | | | | | | |
| V<1> | VA | VB | VB | VB | VB | VB | VB | VB | VB | VB |
| V<2>~ V<$2^K$-1> | VA | VAorVB | VAorVB | VAorVB | VAorVB | VA or VB | VAorVB | VAorVB | VAorVB | VB |
| V<$2^K$> | VA | VA | VA | VA | VA | VA | VA | VA | VA | VB |
| TAIL CURRENT RATIO | | | | | | | | | | |
| m<1>~ m<$2^K$> | 1 | 1 | 1 | 1 | 1 | 1 | 1 | 1 | 1 | 1 |
| OUTPUT VOLTAGE LEVEL | | | | | | | | | | |
| Vout | VA | · · · | · · · | · · · | · · · | · · · | · · · | · · · | · · · | VB |

EXPECTED VALUE: $Vout=(m\langle 1\rangle V\langle 1\rangle+m\langle 2\rangle V\langle 2\rangle+\cdots+m\langle 2^K\rangle V\langle 2^K\rangle)/(m\langle 1\rangle+m\langle 2\rangle+\cdots+m\langle 2^K\rangle)$

FIG. 2A

| DIGITAL DATA DT | | | | | | | | | | | |
|---|---|---|---|---|---|---|---|---|---|---|---|
| D(K-1) | — | 0 | 0 | 0 | 0 | · · · | | 1 | 1 | 1 | 1 |
| ⋮ | — | ⋮ | ⋮ | ⋮ | ⋮ | · · · | | ⋮ | ⋮ | ⋮ | ⋮ |
| D1 | — | 0 | 0 | 1 | 1 | · · · | | 0 | 0 | 1 | 1 |
| D0 | — | 0 | 1 | 0 | 1 | · · · | | 0 | 1 | 0 | 1 |
| NON-INVERTING INPUT TERMINAL INPUT VOLTAGE | | | | | | | | | | | |
| $V<1>$ | VA | VB | VB | VB | VB | VB | | VB | VB | VB | VB |
| $V<2>$ ~ $V<2^K-1>$ | VA | VAorVB | VAorVB | VAorVB | VAorVB | VA or VB | | VAorVB | VAorVB | VAorVB | VB |
| $V<2^K>$ | VA | VA | VA | VA | VA | VA | | VA | VA | VA | VB |
| TAIL CURRENT RATIO | | | | | | | | | | | |
| $m<1>$ | $1+\alpha$ | $1+\alpha$ | $1+\alpha$ | $1+\alpha$ | $1+\alpha$ | $1+\alpha$ | $1+\alpha$ | $1+\alpha$ | $1+\alpha$ | $1+\alpha$ | $1+\alpha$ |
| $m<2>$ ~ $m<2^K-1>$ | 1 | 1 | 1 | 1 | 1 | 1 | 1 | 1 | 1 | 1 | 1 |
| $m<2^K>$ | $1+\alpha$ | $1+\alpha$ | $1+\alpha$ | $1+\alpha$ | $1+\alpha$ | $1+\alpha$ | $1+\alpha$ | $1+\alpha$ | $1+\alpha$ | $1+\alpha$ | $1+\alpha$ |
| OUTPUT VOLTAGE LEVEL | | | | | | | | | | | |
| Vout | VA | ··· | ··· | ··· | ··· | ··· | | ··· | ··· | ··· | VB |

FIG. 2B

K=2 (VA, VB)=(4.08V, 4.0V)

| DIGITAL DATA DT | | | | | |
|---|---|---|---|---|---|
| D1 | | 0 | 0 | 1 | 1 |
| D0 | | 0 | 1 | 0 | 1 |
| NON-INVERTING INPUT TERMINAL INPUT VOLTAGE | | | | | |
| V<1> | 4.08 | 4 | 4 | 4 | 4 |
| V<2> | 4.08 | 4.08 | 4 | 4 | 4 |
| V<3> | 4.08 | 4.08 | 4.08 | 4 | 4 |
| V<4> | 4.08 | 4.08 | 4.08 | 4.08 | 4 |
| TAIL CURRENT RATIO | | | | | |
| m<1>～m<4> | 1 | 1 | 1 | 1 | 1 |
| OUTPUT VOLTAGE LEVEL | | | | | |
| Vout (EXPECTED VALUE) | 4.0800 | 4.0600 | 4.0400 | 4.0200 | 4.0000 |
| Vout (SIM VALUE) | 4.0806 | 4.0613 | 4.0406 | 4.0200 | 4.0006 |
| Voffs | 0.0006 | 0.0013 | 0.0006 | 0.0000 | 0.0006 |

EXPECTED VALUE: Vout=(m<1>V<1>+m<2>V<2>+m<3>V<3>+m<4>V<4>)/(m<1>+m<2>+m<3>+m<4>)

FIG. 4A

K=2 (VA, VB)=(4.08V, 4.0V)

| DIGITAL DATA DT | | | | | |
|---|---|---|---|---|---|
| D1 | | 0 | 0 | 1 | 1 |
| D0 | | 0 | 1 | 0 | 1 |
| NON-INVERTING INPUT TERMINAL INPUT VOLTAGE | | | | | |
| V<1> | 4.08 | 4 | 4 | 4 | 4 |
| V<2> | 4.08 | 4.08 | 4 | 4 | 4 |
| V<3> | 4.08 | 4.08 | 4.08 | 4 | 4 |
| V<4> | 4.08 | 4.08 | 4.08 | 4.08 | 4 |
| TAIL CURRENT RATIO (AFTER CORRECTION): $\alpha$=0.06 | | | | | |
| m<1> | 1.06 | 1.06 | 1.06 | 1.06 | 1.06 |
| m<2> | 1 | 1 | 1 | 1 | 1 |
| m<3> | 1 | 1 | 1 | 1 | 1 |
| m<4> | 1.06 | 1.06 | 1.06 | 1.06 | 1.06 |
| OUTPUT VOLTAGE | | | | | |
| Vout (EXPECTED VALUE) | 4.0800 | 4.0600 | 4.0400 | 4.0200 | 4.0000 |
| Vout (SIM VALUE) | 4.0806 | 4.0608 | 4.0406 | 4.0204 | 4.0006 |
| Voffs | 0.0006 | 0.0008 | 0.0006 | 0.0004 | 0.0006 |

EXPECTED VALUE: Vout=(m<1>V<1>+m<2>V<2>+m<3>V<3>+m<4>V<4>)/(m<1>+m<2>+m<3>+m<4>)

FIG. 4B

K=2 (VA, VB)=(4.08V, 4.0V)

| DIGITAL DATA DT | | | | | |
|---|---|---|---|---|---|
| D1 | | 0 | 0 | 1 | 1 |
| D0 | | 0 | 1 | 0 | 1 |
| NON-INVERTING INPUT TERMINAL INPUT VOLTAGE | | | | | |
| V<1> | 4.08 | 4 | 4 | 4 | 4 |
| V<2> | 4.08 | 4.08 | 4 | 4.08 | 4 |
| V<3> | 4.08 | 4.08 | 4.08 | 4 | 4 |
| V<4> | 4.08 | 4.08 | 4.08 | 4 | 4 |
| TAIL CURRENT RATIO | | | | | |
| m<1>~m<4> | 1 | 1 | 1 | 1 | 1 |
| OUTPUT VOLTAGE | | | | | |
| Vout (EXPECTED VALUE) | 4.0800 | 4.0600 | 4.0400 | 4.0200 | 4.0000 |
| Vout (SIM VALUE) | 4.0806 | 4.0613 | 4.0406 | 4.0200 | 4.0006 |
| Voffs | 0.0006 | 0.0013 | 0.0006 | 0.0000 | 0.0006 |

EXPECTED VALUE: Vout=(m<1>V<1>+m<2>V<2>+m<3>V<3>+m<4>V<4>)/(m<1>+m<2>+m<3>+m<4>)

FIG. 8A

K=2 (VA, VB)=(4.08V, 4.0V)

| DIGITAL DATA DT | | | | | |
|---|---|---|---|---|---|
| D1 | | 0 | 0 | 1 | 1 |
| D0 | | 0 | 1 | 0 | 1 |
| NON-INVERTING INPUT TERMINAL INPUT VOLTAGE | | | | | |
| V<1> | 4.08 | 4 | 4 | 4 | 4 |
| V<2> | 4.08 | 4.08 | 4 | 4.08 | 4 |
| V<3> | 4.08 | 4.08 | 4.08 | 4 | 4 |
| V<4> | 4.08 | 4.08 | 4.08 | 4 | 4 |
| TAIL CURRENT RATIO | | | | | |
| m<1> | 1.06 | 1.06 | 1.06 | 1.06 | 1.06 |
| m<2> | 1.06 | 1 | 1 | 1.06 | 1.06 |
| m<3> | 1 | 1.06 | 1.06 | 1 | 1 |
| m<4> | 1 | 1 | 1 | 1 | 1 |
| OUTPUT VOLTAGE | | | | | |
| Vout (EXPECTED VALUE) | 4.0800 | 4.0600 | 4.0400 | 4.0200 | 4.0000 |
| Vout (SIM VALUE) | 4.0806 | 4.0608 | 4.0406 | 4.0204 | 4.0006 |
| Voffs | 0.0006 | 0.0008 | 0.0006 | 0.0004 | 0.0006 |

EXPECTED VALUE : Vout=(m<1>V<1>+m<2>V<2>+m<3>V<3>+m<4>V<4>)/(m<1>+m<2>+m<3>+m<4>)

FIG. 8B

K=3 (VA, VB) = (4. 12V, 4. 0V)

| DIGITAL DATA DT | | | | | | | | | |
|---|---|---|---|---|---|---|---|---|---|
| D2 | | 0 | 0 | 0 | 0 | 1 | 1 | 1 | 1 |
| D1 | | 0 | 0 | 1 | 1 | 0 | 0 | 1 | 1 |
| D0 | | 0 | 1 | 0 | 1 | 0 | 1 | 0 | 1 |
| NON-INVERTING INPUT TERMINAL INPUT VOLTAGE | | | | | | | | | |
| V<1> | 4. 12 | 4 | 4 | 4 | 4 | 4 | 4 | 4 | 4 |
| V<2> | 4. 12 | 4. 12 | 4 | 4 | 4 | 4 | 4 | 4 | 4 |
| V<3> | 4. 12 | 4. 12 | 4. 12 | 4 | 4 | 4 | 4 | 4 | 4 |
| V<4> | 4. 12 | 4. 12 | 4. 12 | 4. 12 | 4 | 4 | 4 | 4 | 4 |
| V<5> | 4. 12 | 4. 12 | 4. 12 | 4. 12 | 4. 12 | 4 | 4 | 4 | 4 |
| V<6> | 4. 12 | 4. 12 | 4. 12 | 4. 12 | 4. 12 | 4. 12 | 4 | 4 | 4 |
| V<7> | 4. 12 | 4. 12 | 4. 12 | 4. 12 | 4. 12 | 4. 12 | 4. 12 | 4 | 4 |
| V<8> | 4. 12 | 4. 12 | 4. 12 | 4. 12 | 4. 12 | 4. 12 | 4. 12 | 4. 12 | 4 |
| TAIL CURRENT RATIO | | | | | | | | | |
| m<1> | 1 | 1 | 1 | 1 | 1 | 1 | 1 | 1 | 1 |
| m<2> | 1 | 1 | 1 | 1 | 1 | 1 | 1 | 1 | 1 |
| m<3> | 1 | 1 | 1 | 1 | 1 | 1 | 1 | 1 | 1 |
| m<4> | 1 | 1 | 1 | 1 | 1 | 1 | 1 | 1 | 1 |
| m<5> | 1 | 1 | 1 | 1 | 1 | 1 | 1 | 1 | 1 |
| m<6> | 1 | 1 | 1 | 1 | 1 | 1 | 1 | 1 | 1 |
| m<7> | 1 | 1 | 1 | 1 | 1 | 1 | 1 | 1 | 1 |
| m<8> | 1 | 1 | 1 | 1 | 1 | 1 | 1 | 1 | 1 |
| OUTPUT VOLTAGE | | | | | | | | | |
| Vout (EXPECTED VALUE) | 4. 12 | 4.105 | 4.09 | 4.075 | 4.06 | 4.045 | 4.03 | 4.015 | 4 |
| Vout (SIM VALUE) | 4.1205 | 4.1077 | 4.0933 | 4.0775 | 4.0606 | 4.0439 | 4.0279 | 4.0133 | 4.0005 |
| Voffs | 0.0005 | 0.0027 | 0.0033 | 0.0025 | 0.0006 | -0.0011 | -0.0022 | -0.0017 | 0.0005 |

EXPECTED VALUE : Vout=(m<1>V<1>+m<2>V<2>+・・・+m<8>V<8>)/(m<1>+m<2>+・・・+m<8>)

FIG. 11A

K=3 (VA, VB)=(4. 12V, 4. 0V)

| DIGITAL DATA DT | | | | | | | | | |
|---|---|---|---|---|---|---|---|---|---|
| D2 | | 0 | 0 | 0 | 0 | 1 | 1 | 1 | 1 |
| D1 | | 0 | 0 | 1 | 1 | 0 | 0 | 1 | 1 |
| D0 | | 0 | 1 | 0 | 1 | 0 | 1 | 0 | 1 |
| NON-INVERTING INPUT TERMINAL INPUT VOLTAGE | | | | | | | | | |
| V<1> | 4. 12 | 4 | 4 | 4 | 4 | 4 | 4 | 4 | 4 |
| V<2> | 4. 12 | 4. 12 | 4 | 4 | 4 | 4 | 4 | 4 | 4 |
| V<3> | 4. 12 | 4. 12 | 4. 12 | 4 | 4 | 4 | 4 | 4 | 4 |
| V<4> | 4. 12 | 4. 12 | 4. 12 | 4. 12 | 4 | 4 | 4 | 4 | 4 |
| V<5> | 4. 12 | 4. 12 | 4. 12 | 4. 12 | 4. 12 | 4 | 4 | 4 | 4 |
| V<6> | 4. 12 | 4. 12 | 4. 12 | 4. 12 | 4. 12 | 4. 12 | 4 | 4 | 4 |
| V<7> | 4. 12 | 4. 12 | 4. 12 | 4. 12 | 4. 12 | 4. 12 | 4. 12 | 4 | 4 |
| V<8> | 4. 12 | 4. 12 | 4. 12 | 4. 12 | 4. 12 | 4. 12 | 4. 12 | 4. 12 | 4 |
| TAIL CURRENT RATIO | | | | | | | | | |
| m<1> | 1. 2 | 1. 2 | 1. 2 | 1. 2 | 1. 2 | 1. 2 | 1. 2 | 1. 2 | 1. 2 |
| m<2> | 1 | 1 | 1 | 1 | 1 | 1 | 1 | 1 | 1 |
| m<3> | 1 | 1 | 1 | 1 | 1 | 1 | 1 | 1 | 1 |
| m<4> | 1 | 1 | 1 | 1 | 1 | 1 | 1 | 1 | 1 |
| m<5> | 1 | 1 | 1 | 1 | 1 | 1 | 1 | 1 | 1 |
| m<6> | 1 | 1 | 1 | 1 | 1 | 1 | 1 | 1 | 1 |
| m<7> | 1 | 1 | 1 | 1 | 1 | 1 | 1 | 1 | 1 |
| m<8> | 1. 2 | 1. 2 | 1. 2 | 1. 2 | 1. 2 | 1. 2 | 1. 2 | 1. 2 | 1. 2 |
| OUTPUT VOLTAGE | | | | | | | | | |
| Vout (EXPECTED VALUE) | 4. 12 | 4.105 | 4.09 | 4.075 | 4.06 | 4.045 | 4.03 | 4.015 | 4 |
| Vout (SIM VALUE) | 4.1205 | 4.1060 | 4.0920 | 4.0768 | 4.0606 | 4.0446 | 4.0292 | 4.0151 | 4.0005 |
| Voffs | 0.0005 | 0.0010 | 0.0020 | 0.0018 | 0.0006 | -0.0004 | -0.0008 | 0.0001 | 0.0005 |

EXPECTED VALUE : Vout=(m<1>V<1>+m<2>V<2>+···+m<8>V<8>)/(m<1>+m<2>+···+m<8>)

FIG. 11B

K=3 (VA, VB)=(4.12V, 4.0V)

| DIGITAL DATA DT | | | | | | | | | |
|---|---|---|---|---|---|---|---|---|---|
| D2 | | 0 | 0 | 0 | 0 | 1 | 1 | 1 | 1 |
| D1 | | 0 | 0 | 1 | 1 | 0 | 0 | 1 | 1 |
| D0 | | 0 | 1 | 0 | 1 | 0 | 1 | 0 | 1 |
| NON-INVERTING INPUT TERMINAL INPUT VOLTAGE | | | | | | | | | |
| V<1> | 4.12 | 4 | 4 | 4 | 4 | 4 | 4 | 4 | 4 |
| V<2> | 4.12 | 4.12 | 4 | 4.12 | 4 | 4.12 | 4 | 4.12 | 4 |
| V<3> | 4.12 | 4.12 | 4.12 | 4 | 4 | 4 | 4 | 4 | 4 |
| V<4> | 4.12 | 4.12 | 4.12 | 4 | 4 | 4 | 4 | 4 | 4 |
| V<5> | 4.12 | 4.12 | 4.12 | 4.12 | 4.12 | 4 | 4 | 4 | 4 |
| V<6> | 4.12 | 4.12 | 4.12 | 4.12 | 4.12 | 4 | 4 | 4 | 4 |
| V<7> | 4.12 | 4.12 | 4.12 | 4.12 | 4.12 | 4.12 | 4.12 | 4 | 4 |
| V<8> | 4.12 | 4.12 | 4.12 | 4.12 | 4.12 | 4.12 | 4.12 | 4 | 4 |
| TAIL CURRENT RATIO | | | | | | | | | |
| m<1> | 1 | 1 | 1 | 1 | 1 | 1 | 1 | 1 | 1 |
| m<2> | 1 | 1 | 1 | 1 | 1 | 1 | 1 | 1 | 1 |
| m<3> | 1 | 1 | 1 | 1 | 1 | 1 | 1 | 1 | 1 |
| m<4> | 1 | 1 | 1 | 1 | 1 | 1 | 1 | 1 | 1 |
| m<5> | 1 | 1 | 1 | 1 | 1 | 1 | 1 | 1 | 1 |
| m<6> | 1 | 1 | 1 | 1 | 1 | 1 | 1 | 1 | 1 |
| m<7> | 1 | 1 | 1 | 1 | 1 | 1 | 1 | 1 | 1 |
| m<8> | 1 | 1 | 1 | 1 | 1 | 1 | 1 | 1 | 1 |
| OUTPUT VOLTAGE | | | | | | | | | |
| Vout (EXPECTED VALUE) | 4.12 | 4.105 | 4.09 | 4.075 | 4.06 | 4.045 | 4.03 | 4.015 | 4 |
| Vout (SIM VALUE) | 4.1205 | 4.1077 | 4.0933 | 4.0775 | 4.0606 | 4.0439 | 4.0279 | 4.0133 | 4.0005 |
| Voffs | 0.0005 | 0.0027 | 0.0033 | 0.0025 | 0.0006 | -0.0011 | -0.0022 | -0.0017 | 0.0005 |

EXPECTED VALUE : Vout=(m<1>V<1>+m<2>V<2>+···+m<8>V<8>)/(m<1>+m<2>+···+m<8>)

FIG. 14A

K=3 (VA, VB)=(4. 12V, 4. 0V)

| DIGITAL DATA DT | | | | | | | | | |
|---|---|---|---|---|---|---|---|---|---|
| D2 | | 0 | 0 | 0 | 0 | 1 | 1 | 1 | 1 |
| D1 | | 0 | 0 | 1 | 1 | 0 | 0 | 1 | 1 |
| D0 | | 0 | 1 | 0 | 1 | 0 | 1 | 0 | 1 |
| NON-INVERTING INPUT TERMINAL INPUT VOLTAGE | | | | | | | | | |
| V<1> | 4. 12 | 4 | 4 | 4 | 4 | 4 | 4 | 4 | 4 |
| V<2> | 4. 12 | 4. 12 | 4 | 4. 12 | 4 | 4. 12 | 4 | 4. 12 | 4 |
| V<3> | 4. 12 | 4. 12 | 4. 12 | 4 | 4 | 4 | 4 | 4 | 4 |
| V<4> | 4. 12 | 4. 12 | 4. 12 | 4 | 4 | 4 | 4 | 4 | 4 |
| V<5> | 4. 12 | 4. 12 | 4. 12 | 4. 12 | 4. 12 | 4 | 4 | 4 | 4 |
| V<6> | 4. 12 | 4. 12 | 4. 12 | 4. 12 | 4. 12 | 4 | 4 | 4 | 4 |
| V<7> | 4. 12 | 4. 12 | 4. 12 | 4. 12 | 4. 12 | 4. 12 | 4. 12 | 4 | 4 |
| V<8> | 4. 12 | 4. 12 | 4. 12 | 4. 12 | 4. 12 | 4. 12 | 4. 12 | 4 | 4 |
| TAIL CURRENT RATIO | | | | | | | | | |
| m<1> | 1. 2 | 1. 2 | 1. 2 | 1. 2 | 1. 2 | 1. 2 | 1. 2 | 1. 2 | 1. 2 |
| m<2> | 1 | 1. 2 | 1 | 1. 2 | 1 | 1. 2 | 1 | 1. 2 | 1 |
| m<3> | 1 | 1 | 1 | 1 | 1 | 1 | 1 | 1 | 1 |
| m<4> | 1 | 1 | 1 | 1 | 1 | 1 | 1 | 1 | 1 |
| m<5> | 1 | 1 | 1 | 1 | 1 | 1 | 1 | 1 | 1 |
| m<6> | 1 | 1 | 1 | 1 | 1 | 1 | 1 | 1 | 1 |
| m<7> | 1. 2 | 1 | 1. 2 | 1 | 1. 2 | 1 | 1. 2 | 1 | 1. 2 |
| m<8> | 1 | 1 | 1 | 1 | 1 | 1 | 1 | 1 | 1 |
| OUTPUT VOLTAGE | | | | | | | | | |
| Vout (EXPECTED VALUE) | 4. 12 | 4.105 | 4.09 | 4.075 | 4.06 | 4.045 | 4.03 | 4.015 | 4 |
| Vout (SIM VALUE) | 4.1205 | 4.1060 | 4.0920 | 4.0768 | 4.0606 | 4.0446 | 4.0292 | 4.0151 | 4.0005 |
| Voffs | 0.0005 | 0.0010 | 0.0020 | 0.0018 | 0.0006 | -0.0004 | -0.0008 | 0.0001 | 0.0005 |

EXPECTED VALUE : Vout=(m<1>V<1>+m<2>V<2>+···+m<8>V<8>)/(m<1>+m<2>+···+m<8>)

FIG. 14B

K=3 (VA, VB)=(4. 12V, 4. 0V)

| DIGITAL DATA DT | | | | | | | | | |
|---|---|---|---|---|---|---|---|---|---|
| D2 | | 0 | 0 | 0 | 0 | 1 | 1 | 1 | 1 |
| D1 | | 0 | 0 | 1 | 1 | 0 | 0 | 1 | 1 |
| D0 | | 0 | 1 | 0 | 1 | 0 | 1 | 0 | 1 |
| NON-INVERTING INPUT TERMINAL INPUT VOLTAGE | | | | | | | | | |
| V<1> | 4. 12 | 4 | 4 | 4 | 4 | 4 | 4 | 4 | 4 |
| V<2> | 4. 12 | 4. 12 | 4 | 4 | 4 | 4 | 4 | 4 | 4 |
| V<3> | 4. 12 | 4. 12 | 4. 12 | 4 | 4 | 4 | 4 | 4 | 4 |
| V<4> | 4. 12 | 4. 12 | 4. 12 | 4. 12 | 4 | 4 | 4 | 4 | 4 |
| V<5> | 4. 12 | 4. 12 | 4. 12 | 4. 12 | 4. 12 | 4 | 4 | 4 | 4 |
| V<6> | 4. 12 | 4. 12 | 4. 12 | 4. 12 | 4. 12 | 4. 12 | 4 | 4 | 4 |
| V<7> | 4. 12 | 4. 12 | 4. 12 | 4. 12 | 4. 12 | 4. 12 | 4. 12 | 4 | 4 |
| V<8> | 4. 12 | 4. 12 | 4. 12 | 4. 12 | 4. 12 | 4. 12 | 4. 12 | 4. 12 | 4 |
| TAIL CURRENT RATIO | | | | | | | | | |
| m<1> | 1. 2 | 1. 2 | 1. 4 | 1. 6 | 1. 6 | 1. 6 | 1. 4 | 1. 2 | 1. 2 |
| m<2> | 1 | 1 | 1 | 1 | 1 | 1 | 1 | 1 | 1 |
| m<3> | 1 | 1 | 1 | 1 | 1 | 1 | 1 | 1 | 1 |
| m<4> | 1 | 1 | 1 | 1 | 1 | 1 | 1 | 1 | 1 |
| m<5> | 1 | 1 | 1 | 1 | 1 | 1 | 1 | 1 | 1 |
| m<6> | 1 | 1 | 1 | 1 | 1 | 1 | 1 | 1 | 1 |
| m<7> | 1 | 1 | 1 | 1 | 1 | 1 | 1 | 1 | 1 |
| m<8> | 1. 2 | 1. 2 | 1. 4 | 1. 6 | 1. 6 | 1. 6 | 1. 4 | 1. 2 | 1. 2 |
| OUTPUT VOLTAGE | | | | | | | | | |
| Vout (EXPECTED VALUE) | 4. 12 | 4.105 | 4.09 | 4.075 | 4.06 | 4.045 | 4.03 | 4.015 | 4 |
| Vout (SIM VALUE) | 4.1205 | 4.1056 | 4.0906 | 4.0755 | 4.0606 | 4.0458 | 4.0306 | 4.0155 | 4.0005 |
| Voffs | 0.0005 | 0.0006 | 0.0006 | 0.0005 | 0.0006 | 0.0008 | 0.0006 | 0.0005 | 0.0005 |

EXPECTED VALUE : Vout=(m<1>V<1>+m<2>V<2>+・・・+m<8>V<8>) / (m<1>+m<2>+・・・+m<8>)

FIG. 16

| (M-K) BITS | | K BITS: (K=3) | OUTPUT LEVEL |
|---|---|---|---|
| VA | VB | NON-INVERTING INPUT TERMINAL INPUT VOLTAGE | |
| 0 | 8 | COMBINATION SELECTION TO V<1> to V<$2^K$> | 1~8 |
| 8 | 16 | SAME AS ABOVE | 9~16 |
| 16 | 24 | SAME AS ABOVE | 17~24 |
| 24 | 32 | SAME AS ABOVE | 25~32 |
| .... | .... | .... | .... |

FIG. 19

DIGITAL-TO-ANALOG CONVERTER, DATA DRIVER, AND DISPLAY DEVICE

CROSS-REFERENCE TO RELATED APPLICATION

This application is based upon and claims the benefit of priority from the prior Japanese Patent Application No. 2023-041929 filed on Mar. 16, 2023, the entire contents of which are incorporated herein by reference.

BACKGROUND

1. Technical Field

The disclosure relates to a digital-to-analog converter, a data driver including the digital-to-analog converter, and a display device including the data driver.

2. Description of the Related Art

Currently, as an active matrix type display device, a liquid crystal display device, an organic EL display device, or the like has become a mainstream. The display device includes a display panel, a data driver, and a scanning driver. On the display panel, a plurality of data lines and a plurality of scanning lines are wired in an intersecting manner, and display cells connected to the plurality of data lines via pixel switches are arranged in a matrix. The data driver supplies analog voltage signals corresponding to gradation levels to the plurality of data lines of the display panel. The scanning driver supplies scanning signals that control ON/OFF of respective pixel switches to the plurality of scanning lines of the display panel. The data driver includes a digital-to-analog conversion unit that converts video digital signals into analog voltages corresponding to luminance levels and supplies voltage signals obtained by amplifying the analog voltages to respective data lines of the display panel.

The following will describe a schematic configuration of the data driver.

The data driver includes, for example, a shift register, a data register latch, a level shifter, and a digital-to-analog conversion unit.

The shift register generates a plurality of latch timing signals for selecting a latch in synchronization with a clock signal corresponding to a start pulse supplied from a display controller and supplies the latch timing signals to the data register latch. The data register latch acquires video digital data supplied from the display controller for every predetermined S pieces (S is an integer of 2 or more) based on the respective latch timing signals supplied from the shift register, and supplies the S pieces of video digital data signals to the level shifter. The level shifter supplies the digital-to-analog conversion unit with the S pieces of video digital data signals after level shifting obtained by performing level shift processing to increase amplitudes of the signals for each of the S pieces of the video digital data signals supplied from the data register latch.

The digital-to-analog conversion unit includes a reference voltage group generation unit, a decoder unit, and an amplifier unit.

The reference voltage group generation unit generates a plurality of reference voltages having voltage value different from one another and supplies them to the decoder unit. For example, the reference voltage group generation unit supplies a plurality of divided voltages obtained by dividing between at least two reference power supply voltages by a ladder resistor to the decoder unit as a reference voltage group. The decoder unit includes S pieces of decoders each disposed corresponding to an output of the data driver. To each of the decoders, the reference voltage group generated in the reference voltage group generation unit is supplied, the decoder receives the video digital data signal supplied from the level shifter, selects the reference voltage corresponding to the video digital data signal from the plurality of reference voltages, and supplies the selected reference voltage to the amplifier unit. The amplifier unit includes S pieces of differential amplifiers that individually amplify the reference voltage selected by each decoder of the decoder unit and output it.

In the above-described digital-to-analog conversion unit, as the number of reference voltages generated in the reference voltage group generation unit increases, the number of gradations (the number of colors) of a luminance level that can be represented can be increased. However, the increase in the number of the reference voltages generated in the reference voltage group generation unit also increases a wiring region and the number of switch elements included in the decoder selecting the reference voltage by the amount, and a chip size (a manufacturing cost) of the data driver increases.

Therefore, as the above-described differential amplifier, there has been proposed a digital-to-analog converter that employs a differential amplifier that allows dividing between two reference voltages selected based on a luminance level with a predetermined weighting to output three or more of a plurality of voltage values (for example, see JP-A-2002-43944).

JP-A-2002-43944 proposes a negative feedback type differential amplifier that outputs an output voltage having one voltage value among four voltage values obtained by dividing the two reference voltages into four and a digital-to-analog converter using it.

The differential amplifier includes each of four differential pairs driven by the same tail current, has own output voltage fed back and input to a plurality of inverting input terminals in common, is also connected to own non-inverting input terminal, and receives one of the two respective reference voltages with weighting of 1:1:2.

The differential amplifier inputs one of two reference voltages to the non-inverting input terminal of each differential pair in accordance with data of low-order 2 bits in the digital data signal and outputs an output voltage having any one among four voltage levels obtained by dividing between the two reference voltages into four by linear interpolation.

In the digital-to-analog converter including the differential amplifier, in accordance with data of a high-order bit group of the digital data signal, two adjacent reference voltages are selected from every four gradations of a reference voltage group to allow outputting voltage levels 4 times of (F−1) with respect to the number of voltages F of the reference voltage group from the differential amplifier. Thus, in the digital-to-analog converter described in JP-A-2002-43944, the number of the differential pairs of the differential amplifier is equal to the number of the voltage levels obtained by dividing between the two input voltages (the reference voltages) by linear interpolation.

In the digital-to-analog converter described in JP-A-2002-43944, the larger the number of mounted differential pairs is, the more the number of voltage levels obtained by dividing between the two reference voltages becomes, and an area of the decoder can be reduced.

However, in this respect, there was a problem that the larger the voltage difference between the two reference voltages became, the more an error (an output error) occurred in the output voltage actually output with respect to an expected value expected as the output voltage (voltages obtained by dividing between the two reference voltages into plural by linear interpolation).

An object of the disclosure is to provide a digital-to-analog converter, a data driver including the digital-to-analog converter, and a display device that allow reducing an output error.

SUMMARY

A digital-to-analog converter according to the disclosure converts K-bit (K is a positive number of 2 or more) digital data into an analog output voltage and outputs the analog output voltage. The digital-to-analog converter includes a differential amplifier and a first decoder. The differential amplifier includes a plurality of input terminals and outputs the output voltage having one voltage level corresponding to the K-bit digital data among a voltage level group obtained by dividing a voltage received at the respective plurality of input terminals into a Kth-power of 2 pieces by linear interpolation from own output terminals. The first decoder receives a first voltage and a second voltage and distributes and supplies the first voltage or the second voltage to the respective plurality of input terminals of the differential amplifier based on the K-bit digital data. The differential amplifier includes: a Kth-power of 2 pieces of differential pairs each including an inverting input terminal to which the output voltage is input in common, a non-inverting input terminal to which one of voltages received at the plurality of input terminals is supplied as an input voltage, and an output pair, each of the output pairs being connected in common, and the Kth-power of 2 pieces of respective differential pairs being driven by an individually received tail current; an amplification stage that generates the output voltage by an amplification action based on an output of one or both of the output pair of each of the Kth-power of 2 pieces of the differential pairs; and a tail current control circuit that individually supplies the tail current to each of the Kth-power of 2 pieces of the differential pairs. The tail current control circuit sets a current ratio to a reference current value in the tail current flowing through respective differential pairs excluding two differential pairs among the Kth-power of 2 pieces of the differential pairs as a predetermined reference value. The current ratio of the tail current flowing through the two respective differential pairs is set to a value larger than the reference value.

A data driver according to the disclosure includes a plurality of the digital-to-analog converters described above. The plurality of digital-to-analog converters convert each of video digital data pieces representing a luminance level of each pixel by a digital value into a respective plurality of the output voltages having analog voltage values and supply a respective plurality of drive signals having the plurality of output voltages to a plurality of data lines of a display panel.

A display device according to the disclosure includes a display panel and a data driver. The display panel includes a respective plurality of data lines to which a plurality of display cells are connected. The data driver includes a plurality of digital-to-analog converters described above. The plurality of digital-to-analog converters convert each of video digital data pieces representing a luminance level of each pixel by a digital value into a respective plurality of the output voltages having analog voltage values and supply a respective plurality of drive signals having the plurality of output voltages to the plurality of data lines of the display panel.

BRIEF DESCRIPTION OF THE DRAWINGS

Features of the disclosure will be described below with reference to the accompanying drawings.

FIG. 2A is a diagram representing a basic specification of the digital-to-analog converter 100_1;

FIG. 2B is a diagram representing a specification in which correction of a tail current ratio is performed on the basic specification of the digital-to-analog converter 100_1;

FIG. 4A is a diagram representing an example of a basic specification (K=2) of the digital-to-analog converter 100_2;

FIG. 4B is a diagram representing a specification in which correction of the tail current ratio is performed on the basic specification of the digital-to-analog converter 100_2;

FIG. 8A is a diagram illustrating a modification of the basic specification illustrated in FIG. 4A;

FIG. 8B is a diagram representing a specification in which the tail current ratio illustrated in the basic specification of FIG. 8A is corrected;

FIG. 11A is a diagram representing an example of the basic specification (K=3) of the digital-to-analog converter 100_3;

FIG. 11B is a diagram representing a specification in which correction of a tail current ratio is performed on the basic specification of the digital-to-analog converter 100_3;

FIG. 14A is a diagram illustrating a modification of the basic specification illustrated in FIG. 11A;

FIG. 14B is a diagram representing a specification in which the tail current ratio illustrated in the basic specification of FIG. 14A is corrected;

FIG. 16 is a diagram illustrating another example of the specification after correcting the tail current ratio in the digital-to-analog converter 100_3;

FIG. 19 is a diagram illustrating an example of a specification of the digital-to-analog converter 100_4.

DETAILED DESCRIPTION

The digital-to-analog converter according to the disclosure includes the differential amplifier that includes the Kth-power of 2 pieces of the differential pairs that receive the input voltages and the output voltages received at the plurality of input terminals at the respective inverting input terminals and non-inverting input terminals and the decoder that distributes and supplies one of the first and second voltages to the respective input terminals of the differential amplifier based on K-bit digital data. The differential amplifier includes the tail current ratio control circuit that, while individually supplying the tail current to drive the Kth-power of 2 pieces of the differential pairs to the respective differential pairs, sets the current ratio to the reference current value in the tail current flowing through the respective differential pairs excluding the two differential pairs as a predetermined reference value, and controls the current ratio of the tail current flowing through the respective two differential pairs to be larger than the reference value.

With the tail current ratio control circuit, an output error in an opposite direction to an output error with respect to an expected value that occurs in the output voltage when all of the current ratios of the tail currents flowing through the respective differential pairs are unified to the reference value occurs, and the output error is offset.

Therefore, the disclosure allows reducing the output error generated in the analog output voltage of the digital-to-analog converter.

Embodiment 1

Figure 1:
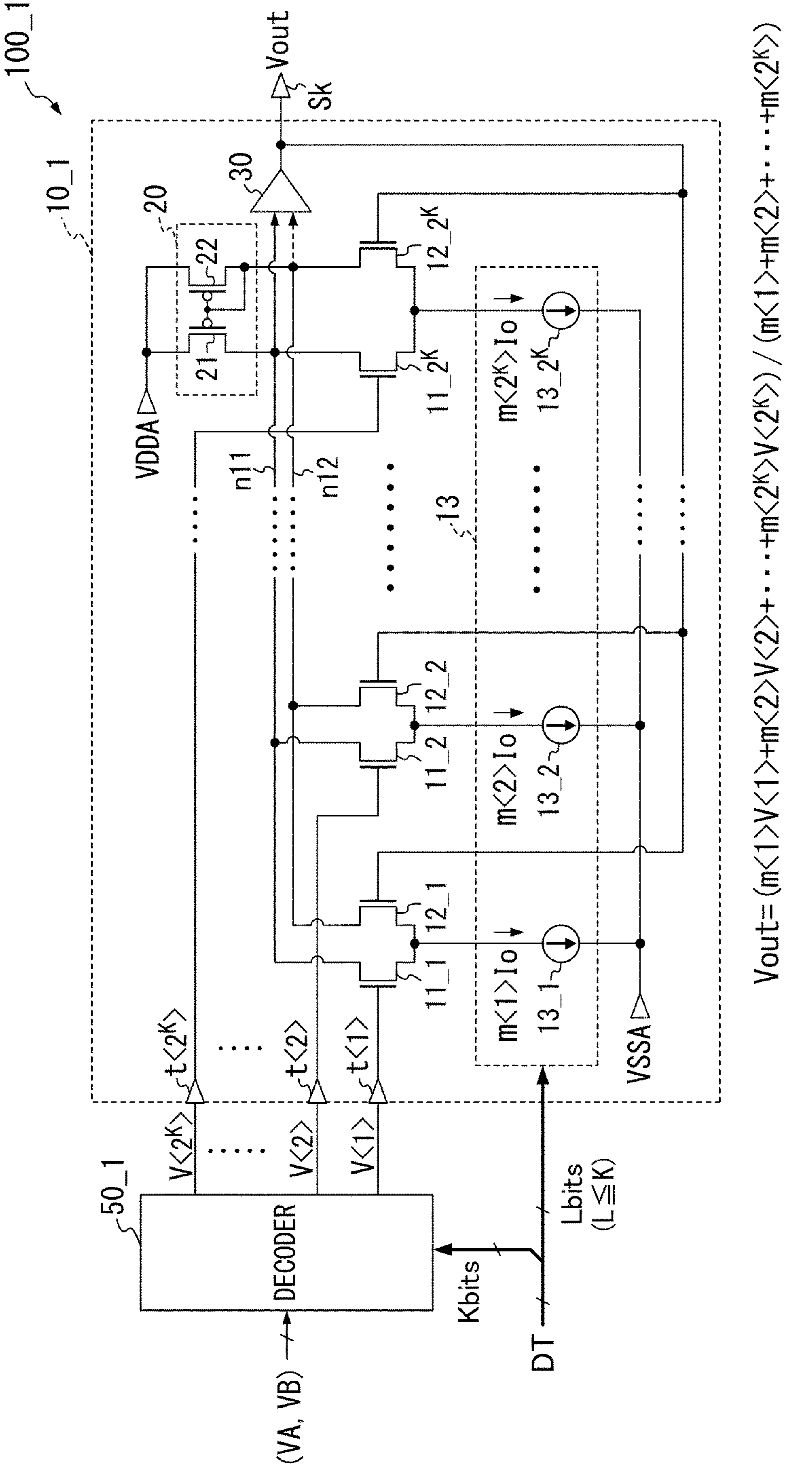
FIG. 1 is a circuit diagram illustrating a configuration of a digital-to-analog converter 100_1 as a first embodiment of the disclosure.

FIG. 1 is a circuit diagram illustrating a configuration of a digital-to-analog converter 100_1 as the first embodiment of the disclosure.

As illustrated in FIG. 1, the digital-to-analog converter 100_1 includes a decoder 50_1 and a differential amplifier 10_1 including a Kth-power of 2 (K is an integer of 2 or more) pieces of differential pairs, and converts K bits of digital data signals DT into output voltage signals Vout having an analog voltage level.

The decoder 50_1 receives the digital data signal DT and two voltages VA and VB formed of voltage values different of one another. Based on the digital data signal DT, the decoder 50_1 selects a combination of assigning the two voltages VA and VB for respective input terminals t<1> to t<$2^K$> of the differential amplifier 10_1. The decoder 50_1 supplies input voltages V<1> to V<$2^K$> each indicating one of the voltages VA and VB by the selected combination to the input terminals t<1> to t<$2^K$> as non-inverting input terminals of the differential amplifier 10_1.

The differential amplifier 10_1 amplifies one voltage level corresponding to the digital data signal DT among the Kth-power of 2 pieces of voltage levels obtained by dividing between the voltages VA and VB into the Kth-power of 2 pieces by linear interpolation, and outputs the amplification result as an output voltage signal Vout. The differential amplifier 10_1 includes the Kth-power of 2 pieces of differential pairs (11_1, 12_1) to (11_$2^K$, 12_$2^K$) having the same conductivity type (an N channel type in FIG. 1) to which respective tail currents are supplied and respective output pairs are connected in common, a tail current control circuit 13, a current mirror circuit 20 and an amplification stage 30. Note that the Kth-power of 2 pieces of the voltage levels include any one of the voltage VA and VB.

The current mirror circuit 20 includes P channel type transistors 21 and 22 having gates connected to one another and the same size. To sources of the respective transistors 21 and 22, a high potential power supply voltage VDDA is applied. Additionally, a drain of the transistor 21 is connected to a node n11, and a gate and a drain of the transistor 22 are connected to a node n12. The nodes n11, n12 are connected to respective output pairs of the differential pairs (11_1, 12_1) to (11_$2^K$, 12_$2^K$). With the configuration, the current mirror circuit 20 operates as a common load of the differential pairs (11_1, 12_1) to (11_$2^K$, 12_$2^K$).

To respective inverting input terminals of the differential pairs (11_1, 12_1) to (11_$2^K$, 12_$2^K$), that is, respective gates of N channel type transistors (also referred to as differential pair transistors) 12_1 to 12_$2^K$, the output voltage signal Vout is fed back and input. Respective non-inverting input terminals of the differential pairs (11_1, 12_1) to (11_$2^K$, 12_$2^K$), that is, respective gates of N channel type transistors (also referred to as differential pair transistors) 11_1 to 11_$2^K$ are connected to the input terminals t<1> to t<$2^K$>. That is, to respective gates of the differential pair transistors 11_1 to 11_$2^K$, the input voltages V<1> to V<$2^K$> each having the voltage VA or VB are supplied.

The transistors 11_1 to 11_$2^K$ have the same transistor property, and the respective drains are connected in common by the node n11. The transistors 12_1 to 12_$2^K$ have the same transistor property, and the respective drains are connected to the node n12 in common. That is, the Kth-power of 2 pieces of the differential pairs (11_1, 12_1) to (11_$2^K$, 12_$2^K$) have a connection configuration of a parallel configuration in which the output pairs are connected in common. Sources of the respective transistors of the differential pairs (11_1, 12_1) to (11_$2^K$, 12_$2^K$) are connected to one another, and each of them is individually connected to the tail current control circuit 13.

Hereinafter, an operation will be described assuming that the differential pair transistors constituting the respective differential pairs (11_1, 12_1) to (11_2$^K$, 12_2$^K$) have an equivalent property. That is, in the actual configuration, for example, there is a case of replacing a plurality of differential pairs having a common input with one differential pair in which a size of a differential pair transistor is changed. However, for convenience of explanation, it is assumed that the properties of the differential pair transistors of the respective differential pairs are the same, and a configuration equivalent to it is also included in the disclosure. As the simplest specific example, all of the respective differential pair transistors of the differential pairs (11_1, 12_1) to (11_2$^K$, 12_2$^K$) are assumed to have the same size.

The tail current control circuit 13 includes current sources 13_1 to 13_2$^K$ individually connected to between the respective sources of the differential pairs (11_1, 12_1) to (11_2$^K$, 12_2$^K$) and a low potential power supply voltage VSSA. The current sources 13_1 to 13_2$^K$ generate a tail current supplied to the respective sources of the differential pairs (11_1, 12_1) to (11_2$^K$, 12_2$^K$).

Here, among the current sources 13_1 to 13_2$^K$, the respective current sources excluding specific two current sources generate the tail current having a current value of a current ratio to a predetermined reference current value of "1." On the other hand, the above-described specific two current sources generate the tail current having a current value of a current ratio to the reference current value of "1+a" (x is the actual number of less than 1). In this respect, the specific two current sources are a current source flowing the tail current to the differential pairs receiving the voltage VA among the differential pairs (11_1, 12_1) to (11_2$^K$, 12_2$^K$) and a current source flowing the tail current to the differential pair receiving the voltage VB. The specific two current sources may be a variable current source that allows switching the current ratio to "1" or "1+a" based on the voltage difference between the above-described two voltages VA and VB and low-order L bits (L is an integer of 2 or more) of the digital data signal DT. Additionally, regarding the specific two current sources, as long as one of each of the connected differential pairs receives the voltage VA and the other one receives the voltage VB, based on the low-order L bits of the digital data signal DT, the current source may be switched to another current source as necessary.

Additionally, in specific three current sources among the current source 13_1 to 13_2$^K$, the current ratio to the reference current value may be "1" or "1+a" and the current ratio may be fixed to "1" in the other respective current sources. In this respect, one among the specific three current sources may be a fixed current source having the current ratio fixed to "1+a" and the remaining two current sources may be variable current sources having the respective current ratios that can be switched to "1" or "1+a" based on the low-order L bits of the digital data signal DT.

The amplification stage 30 generates a signal obtained by an amplification action based on the voltage generated in one or both of the output pair (the node n11, n12) of the Kth-power of 2 pieces of the differential pairs connected in common as the output voltage signal Vout and outputs it via an output terminal Sk.

The following will describe the amplification operation of the differential amplifier 10_1 illustrated in FIG. 1.

Note that, for convenience of explanation, setting currents of the current sources 13_1 to 13_2$^K$ to supply the tail current to the respective differential pairs (11_1, 12_1) to (11_2$^K$, 12_2$^K$) are m<1>Io to m<2>Io, respectively. Here, Io is the above-described reference current value, and respective m<1> to m<2$^K$> are current ratios of the tail currents flowed to the respective differential pairs (11_1, 12_1) to (11_2$^K$, 12_2$^K$) (also referred to as a tail current ratio). Although the current ratios of the specific two current sources among the current sources 13_1 to 13_2$^K$ are "1+α", the two a are values sufficiently smaller than the total current ratio. That is, the following e formula (1) is satisfied for the tail current ratios m<1> to m<2$^K$> as a coefficient to the reference current value Io.

$$m\langle 1\rangle + m\langle 2\rangle + \ldots + m\langle 2^K\rangle = 2^K + 2\alpha \approx 2^K \tag{1}$$

Note that for convenience of calculation, when $2^K$=n, $$m\langle 1\rangle + m\langle 2\rangle + \ldots + m\langle n\rangle = n. \tag{1a}$$

Regarding the i-th differential pair of n (=$2^K$) pieces, when a current of the differential pair transistor at the non-inverting input terminal side is Iai and a current of the differential pair transistor at the inverting input terminal side is Ibi, the following formulae (2) and (3) are satisfied.

$$Iai = Is + gmi\cdot(V\langle i\rangle - Vs) \tag{2}$$

$$Ibi = Is + gmi\cdot(Vout - Vs) \tag{3}$$

Note that Is, Vs represent predetermined operating points within a voltage range in which linear interpolation can be performed on an IV characteristic curve of the differential pair transistor, and V<i>, Vout represent voltages near Vs (within the linear interpolation range). Additionally, a transconductance gm at the operating point of the differential pair transistor at the non-inverting input terminal side and the inverting input terminal side is represented as gmi.

Here, when a current weighting ratio of the current supplied to the i-th differential pair is m<i>, the above-described formulae (2) and (3) are represented by the following formulae (4) and (5).

$$m\langle i\rangle Iai = m\langle i\rangle Is + gmim\langle i\rangle\ (V\langle i\rangle - Vs) \tag{4}$$

$$m\langle i\rangle Ibi = m\langle i\rangle Is + gmim\langle i\rangle\ (Vout - Vs) \tag{5}$$

When a difference between the formulae (4) and (5) is obtained, the following formula (6) is obtained.

$$m\langle i\rangle\ (Iai - Ibi) = gmim\langle i\rangle\ (V\langle i\rangle - Vout) \tag{6}$$

Further, when a variation in the operating point to a variation of the current weighting ratio in the current supplied to each of the differential pairs (any given i value) is within the linear interpolation range, gm can be approximated to be constant (gmi=gm).

Regarding i=1 to n of the above-described formula (6), when the left-hand sides are added and the right-hand sides are added, the following formulae (7) and (8) are obtained.

$$\text{Left side} = (m\langle 1\rangle Ia_1 + \ldots + m\langle n\rangle Ia_n) - (m\langle 1\rangle Ib_1 + \ldots + m\langle n\rangle Ib_n) \quad (7)$$

$$\text{Right side} = g_m((m\langle 1\rangle V\langle 1\rangle + \ldots + m\langle n\rangle V\langle n\rangle) - (m\langle 1\rangle + \ldots + m\langle n\rangle)Vout)) \quad (8)$$

Here, the above-described left-hand side is a difference in the total current between the respective differential pair transistor at the non-inverting input terminal side and differential pair transistor at the inverting input terminal side and corresponds to a relationship between an input current and an output current in the current mirror circuit 20. In this respect, since the sum of the currents flowing through the respective differential pair transistors at the non-inverting input terminal sides and the sum of the currents flowing through the respective differential pair transistors at the inverting input terminal sides are equal to one another, the difference between the total currents is zero, that is, the above-described left-hand side becomes zero.

On the other hand, the coefficient (m<1>+ . . . +m<n>) of the above-described right-hand side output voltage signal Vout becomes a constant value n (=$2^K$) by the formula (Ia) and is represented as in the following formulae (9) and (10) by the formulae (7) and (8).

$$Vout = (m\langle 1\rangle V\langle 1\rangle + \ldots + m\langle n\rangle V\langle n\rangle)/n \quad (9)$$

Here, when n is returned to $2^K$, the output voltage signal Vout is represented by the following formula.

$$Vout = \left(m\langle 1\rangle V\langle 1\rangle + \ldots + m\langle 2^K\rangle V\langle 2^K\rangle / (m\langle 1\rangle + \ldots + m\langle 2^K\rangle)\right) \quad (10)$$

As described above, as shown in the formula (10), the output voltage signal Vout of the differential amplifier 10_1 illustrated in FIG. 1 becomes a weighted average value of an integrated value of weighting of the input voltage and weighting of the tail current ratio to the input voltage of the non-inverting input terminal of each differential pair.

Note that in the formula (10), an average of the tail current ratios m<1> to m<$2^K$> is a predetermined reference value, and the total tail current ratio (or the average) becomes approximately constant.

Accordingly, the output voltage signal Vout represented by the formula (10) can take a multivalued voltage obtained by equally dividing between the voltages VA and VB by linear interpolation by a combination of the two voltages (VA, VB) supplied to the non-inverting input terminals of the respective differential pairs and a combination of the tail current ratios of the respective differential pairs. Among them, by the optimal combination of the two voltages (VA, VB) and combination of the tail current ratio, the voltage level obtained by approximately equally dividing between the voltages VA and VB by the Kth-power of 2 pieces can be generated.

The following will describe a specification example of the digital-to-analog converter 100_1 illustrated in FIG. 1 with reference to FIG. 2A and FIG. 2B.

FIG. 2A is a diagram illustrating an example of an input voltage setting specification representing contents of the input voltages V<1> to V<$2^K$> supplied to the respective non-inverting input terminals of the differential pairs (11_1, 12_1) to (11_2$^K$, 12_2$^K$) based on the digital data signals DT by the decoder 50_1 and a basic specification of the tail current ratios m<1> to m<$2^K$> of the respective differential pairs (11_1, 12_1) to (11_2$^K$, 12_2$^K$) set corresponding to respective digital codes of the digital data signals DT.

In the basic specification of FIG. 2A, the output voltage signal Vout has the voltage level obtained by dividing between the voltages VA and VB into the Kth-power of 2 pieces, and the Kth-power of 2 pieces of the voltage levels excluding the voltage VA correspond to the respective codes of D0 to D(K−1) formed of K bits of the digital data signals DT.

For example, when the bits D0 to D(K−1) in the digital data signal DT represents the maximum value (all bits are at a logical level 1), only the voltage VB is assigned to the respective input voltages V<1> to V<$2^K$>.

Additionally, in the basic specification illustrated in FIG. 2A, excluding the case of representing the maximum value as described above (all bits are the logical level 1), regardless of the content of the bits D0 to D(K−1), the voltage VB is assigned as the input voltage V<1> and the voltage VA is assigned as the input voltage V<$2^K$>. Further, in the specification illustrated in FIG. 2A, to the respective input voltages V<2> to V<$2^K$−1>, the voltage VA or VB is assigned for each digital code represented by the bits D0 to D(K−1).

Additionally, in the basic specification illustrated in FIG. 2A, the tail current ratios m<1> to m<$2^K$> of all of the differential pairs (11_1, 12_1) to (11_2$^K$, 12_2$^K$) are controlled to be fixed to the reference value "1" regardless of the respective digital codes by the digital data signals DT.

Here, the values of the input voltages V<1> to V<$2^K$> and the tail current ratios m<1> to m<$2^K$> illustrated in the basic specification of FIG. 2A are obtained so as to follow the property of performing the linear interpolation between the voltages VA and VB such that the voltage levels of the Kth-power of 2 pieces of the output voltage signals Vout corresponding to the digital codes by the digital data signals DT satisfy the above-described formula (10).

However, when the voltage difference between the voltages VA and VB is comparatively large, or the reference current value Io of the tail current is reduced to be low due to lowered electric power, when the digital-to-analog converter 100_1 is actually operated in accordance with the basic specification of FIG. 2A, a slightly large error (referred to as an output error) occurs in the voltage level of the output voltage signal Vout. The reason is that an actual IV characteristic curve of the differential pair transistor is a quadratic curve, and because when the operating point on the IV characteristic curve of the differential pair transistor operates in a region between two voltages having a large voltage difference or operates in a low current region close to a threshold voltage, a deviation with the linear interpolation increases.

Therefore, to reduce the output error, the following correction is performed on the tail current ratios m<1> to m<$2^K$> formed of the reference value "1" illustrated in the basic specification of FIG. 2A.

FIG. 2B is a diagram representing an example of a specification after correcting the tail current ratios m<1> to m<2> in which correction of the tail current ratio illustrated in the basic specification of FIG. 2A is performed.

In the example illustrated in FIG. 2B, all of the tail current ratios m<2> to m<$2^K$−1> by the respective current sources 13_2 to 13_($2^K$−1) are set to the reference value "1" similarly to the basic specification.

However, as illustrated in FIG. 2B, the tail current ratio m<1> of the current source 13_1 to flow the tail current to the differential pair (11_1, 12_1) receiving as the voltage VB as the input voltage V<1> is set to "1+α" regardless of the digital data signal DT. Additionally, excluding the digital data signal DT represents the maximum value, that is, excluding the case of D0 to D(K−1) all representing the logical level 1, the tail current ratio m<$2^K$> of the current source 13_2$^K$ to flow the tail current to the differential pair (11_2$^K$, 12_2$^K$) receiving the voltage VA as the input voltage V<$2^K$> is also set to "1+a."

That is, in the digital-to-analog converter 100_1, as illustrated in FIG. 2B, the values of the two tail current ratios m<1> and m<$2^K$> among the tail current ratios m<1> to m<$2^K$> are corrected to "1+a" obtained by adding "α" to "1" to the respective values of the other tail current ratios m<2> to m<$2^K$−1>. Thus, in the digital-to-analog converter 100_1, to generate the output voltage signal Vout at the Kth-power of 2 pieces of the voltage levels by dividing between the voltages VA and VB by the linear interpolation using the Kth-power of 2 pieces of the differential pairs, the output error generated when the actual IV characteristic curve of the transistors forming the differential pairs is the quadratic curve is reduced. Especially, when the voltage difference between the voltages VA and VB is comparatively large or when the reference current value Io of the tail current is reduced to be low for lowered electric power, the reduction effect of the output error is large.

Accordingly, with the digital-to-analog converter 100_1 that operates in accordance with the specification illustrated in FIG. 2B, the highly accurate analog voltage can be output with the reduced output error.

Note that the current mirror circuit 20 included in the differential amplifier 10_1 is not limited to the configuration illustrated in FIG. 1, and, for example, any given current mirror circuit, such as a cascode type, may be employed.

As the differential pairs (11_1, 12_1) to (11_2$^K$, 12_2$^K$) included in the differential amplifier 10_1, instead of the N channel type differential pair illustrated in FIG. 1, a P channel type differential pair and a both conductivity type differential pair that forms a pair by an N channel type transistor and a P channel type transistor may be employed.

In FIG. 2A and FIG. 2B, the specification example in which the K bits of respective digital codes are assigned to the Kth-power of 2 pieces of the voltage levels up to the voltage VB excluding the voltage VA among the voltage levels of dividing between the voltages VA and VB into the Kth-power of 2 pieces has been described, but it can be replaced by a specification in which the K bits of the respective digital codes are assigned to the Kth-power of 2 pieces of the voltage levels including the voltage VA and excluding the voltage VB.

For convenience of explanation, the following respective embodiments also will be described with the exemplary configuration of the differential amplifier including the Kth-power of 2 pieces of the N channel type differential pairs similar to FIG. 1 and the specification example in which the K bits of the respective digital codes similar to FIG. 2A and FIG. 2B are assigned to the Kth-power of 2 pieces of the voltage levels excluding the voltage VA. In this respect, it is obvious that partial replacement of the differential amplifier as described above and replacement of assignment of the digital code can be similarly performed.

Embodiment 2

Figure 3:
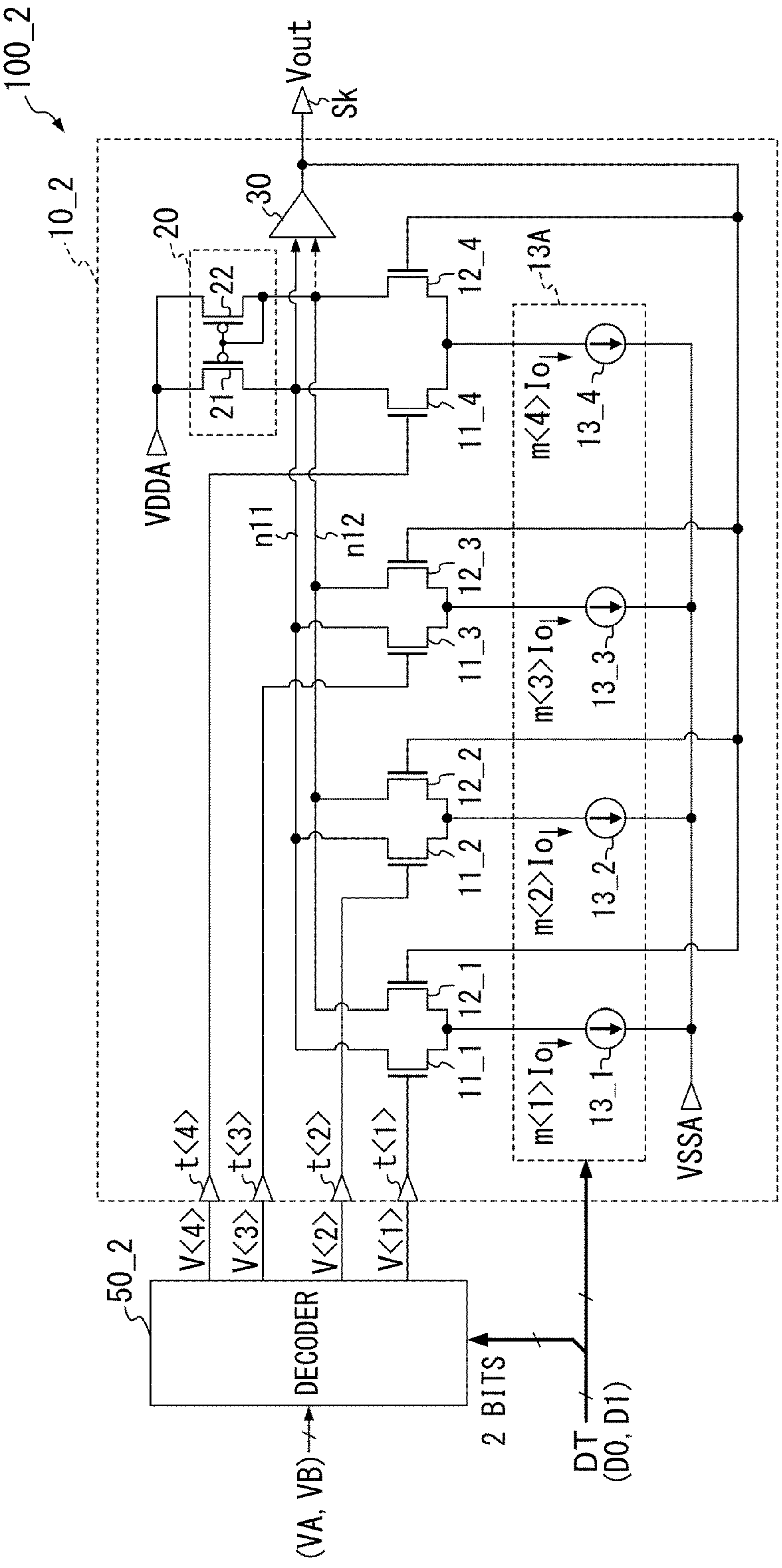
FIG. 3 is a circuit diagram illustrating a configuration of a digital-to-analog converter 100_2 as a second embodiment of the disclosure.

FIG. 3 is a circuit diagram illustrating a configuration of a digital-to-analog converter 100_2 as the second embodiment of the disclosure.

The digital-to-analog converter 100_2 receives the 2-bit digital data signal DT, converts it into the output voltage signal Vout, and outputs it. The digital-to-analog converter 100_2 includes a decoder 50_2 and a differential amplifier 10_2.

The decoder 50_2 receives the 2-bit (D0, D1) digital data signals DT and the two voltages VA and VB formed of the voltage values different from one another. The decoder 50_2 selects the combination of assigning the two voltages VA and VB to the respective input terminals t<1> to t<4> of the differential amplifier 10_2 based on the digital data signals DT. The decoder 50_2 supplies the input voltages V<1> to V<4> indicating one of the respective voltages VA and VB by the selected combination to the input terminals t<1> to t<4> as the non-inverting input terminals of the differential amplifier 10_2.

The differential amplifier 10_2 amplifies one voltage level corresponding to the 2-bit digital data signal DT among the four voltage levels obtained by dividing between the voltages VA and VB by the linear interpolation, and outputs the amplification result as the output voltage signal Vout. The differential amplifier 10_2 includes the four respective differential pairs (11_1, 12_1) to (11_4, 12_4) of the same conductivity type (the N channel type in FIG. 3) to which the tail current is supplied and having respective output pairs connected in common, a tail current control circuit 13A and, the current mirror circuit 20, and the amplification stage 30.

Note that in the digital-to-analog converter 100_2, the number of differential pairs included in the differential amplifier 10_1 of the digital-to-analog converter 100_1 illustrated in FIG. 1 is four, that is, K=2, and the other configuration and the basic operation are the same as the digital-to-analog converter 100_1 described above, and therefore the description of the configuration and the basic operation will be omitted.

The following will describe the specification of causing the digital-to-analog converter 100_2 to operate.

FIG. 4A is a diagram illustrating the basic specification of the digital-to-analog converter 100_2.

Note that FIG. 4A represents a relationship between the combination of the two respective voltages (VA, VB) assigned as the input voltages V<1> to V<4> supplied to the differential amplifier 10_2 by the decoder 50_2 based on the 2-bit (D0, D1) digital data signals Dt, the tail current ratios m<1> to m<4>, and the output voltage signals Vout. FIG. 4A illustrates a specification example in which the four voltage levels excluding the voltage levels having the voltage VA among the five voltage levels obtained by dividing between the voltages VA and VB into 4 are assigned for the respective 2-bit (D0, D1) digital codes.

In the basic specification illustrated in FIG. 4A, similarly to FIG. 2A, the tail current ratios m<1> to m<4> corresponding to the respective differential pairs (11_1, 12_1) to (11_4, 12_4) are all set to the reference value "1." Further, the two voltages (VA, VB) received by the decoder 50_2 are set to the voltage levels (4.08 volts, and 4.00 volts). Accordingly, as illustrated in FIG. 4A, the decoder 50_2 supplies the respective input voltages V<1> to V<4> having 4.08 or 4.00 volts to the differential amplifier 10_2 for each digital code of the 2-bit (D0, D1) digital data signals DT.

Thus, the expected value of the output voltage signal Vout output from the differential amplifier 10_2 is represented by the following formula from the formula (10).

$$Vout=(m\langle 1\rangle V1+m\langle 2\rangle V2+m\langle 3\rangle V3+m\langle 4\rangle V4/(m\langle 1\rangle+m\langle 2\rangle+m\langle 3\rangle+m\langle 4\rangle))$$

That is, the expected value of the output voltage signal Vout for each digital code of the digital data signal DT when between the voltage levels 4.00 volts and 4.08 volts is divided into four by the linear interpolation is, as illustrated in FIG. 4A, as follows:

4.0000 volts,
4.0200 volts,
4.0400 volts,
4.0600 volts, and
4.0800 volts.

The voltage level (an SIM value) of the output voltage signal Vout for each digital code of the digital data signal DT obtained when the differential amplifier 10_2 is actually operated using the input voltages V<1> to V<4> and the tail current ratios m<1> to m<4> is, as illustrated in FIG. 4A, as follows:

4.0006 volts,
4.0200 volts,
4.0406 volts,
4.0613 volts, and
4.0806 volts.

Accordingly, as illustrated in FIG. 4A, an output error Voffs obtained by subtracting the expected value of the output voltage signal Vout from the voltage level (the SIM value) of the output voltage signal Vout to each of the expected values of the output voltage signal Vout is as follows:

0.0006 volts,
volts,
0.0006 volts,
0.0013 volts, and
0.0006 volts.

Note that 0.6 millivolts in the output error Voffs is the unique output error depending on the configuration of the differential amplifier and is uniquely included in the respective voltage levels of the output voltage signals Vout. Since the unique output error depending on the configuration of the differential amplifier differs from the output error by the linear interpolation of the two voltages (VA, VB), it is outside the target of correction described below.

That is, as illustrated in FIG. 4A, in the output voltage signal Vout, the output error Voffs of about plus or minus 0.7 millivolts that becomes larger or smaller than each of the expected values is generated.

Therefore, in the tail current control circuit 13A, when the voltage level of the output voltage signal Vout becomes smaller (larger) than the expected value, the tail current ratios m<1> and m<4> are corrected such that the error occurs in a direction of the voltage level being larger (smaller) than the expected value.

FIG. 4B is a diagram illustrating an example of the specification of the digital-to-analog converter 100_2 in which the correction with the above-described correction value "α" is performed on the tail current ratios m<1> and m<4> of the reference value "1" illustrated in the basic specification of FIG. 4A. Note that, in the specification illustrated in FIG. 4B, the respective values of the input voltages V<1> to V<4> based on the digital data signals DT and the expected values of the output voltage signals Vout are the same as those illustrated in FIG. 4A.

In the specification illustrated in FIG. 4B, among the tail current ratios m<1> to m<4> corresponding to the respective differential pairs (11_1, 12_1) to (11_4, 12_4), only the respective values of the tail current ratios m<1> and m<4> are corrected to "1.06" obtained by adding "0.06" as "α" to the reference value "1."

Figure 5:
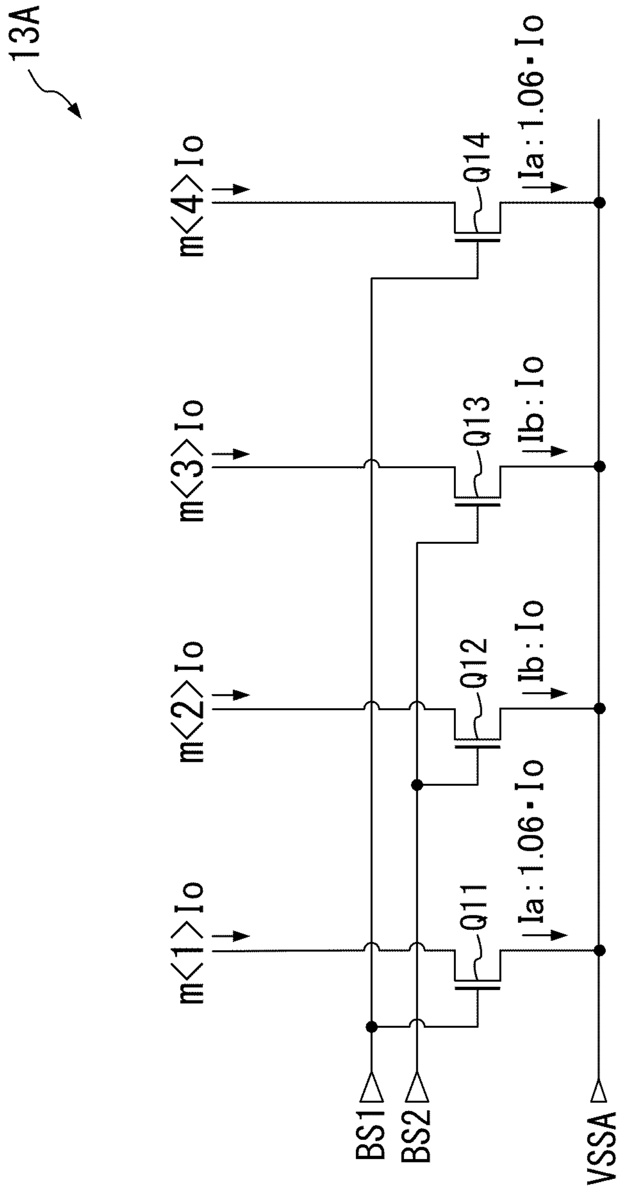
FIG. 5 is a circuit diagram illustrating an example of a tail current control circuit 13A.

FIG. 5 is a circuit diagram illustrating a specific circuit configuration of the current sources 13_1 to 13_4 that generate tail currents m<1>Io to m<4> based on the tail current ratios m<1> to m<4> as the tail current control circuit 13A.

As illustrated in FIG. 5, the tail current control circuit 13A includes N channel type current source transistors Q11 to Q14 as the current sources 13_1 to 13_4. To respective sources of the current source transistors Q11 to Q14, the low potential power supply voltage VSSA is applied, and respective drains are individually connected to sources of the differential pairs (11_1, 12_1) to (11_4, 12_4).

Here, the current source transistors Q11 and Q14 receive a predetermined bias voltage signal BS1 by own gates to generate a constant current Ia obtained by multiplying the reference current value Io by the tail current ratio "1.06" on which the correction has been performed as illustrated in FIG. 4B. On the other hand, the current source transistors Q12 and Q13 receive a predetermined bias voltage signal BS2 by own gates to generate a constant current Ib obtained by multiplying the reference current value Io by the tail current ratio "1."

Accordingly, the voltage level (the SIM value) of the output voltage signal Vout for each digital code of the digital data signal DT obtained when the differential amplifier 10_2 is actually operated using the tail current ratios m<1> to m<4> and the input voltages V<1> to V<4> is, as illustrated in FIG. 4B, as follows:

4.0006 volts,
4.0204 volts,
4.0406 volts,
4.0608 volts, and
4.0806 volts.

As a result, the output error Voffs obtained by subtracting the expected value of the output voltage signal Vout from the voltage level (the SIM value) of the output voltage signal Vout to each of the expected values of the output voltage signal Vout as illustrated in FIG. 4B is as follows:

0.0006 volts,
0.0004 volts,
0.0006 volts,
0.0008 volts, and
0.0006 volts.

Figure 6A:
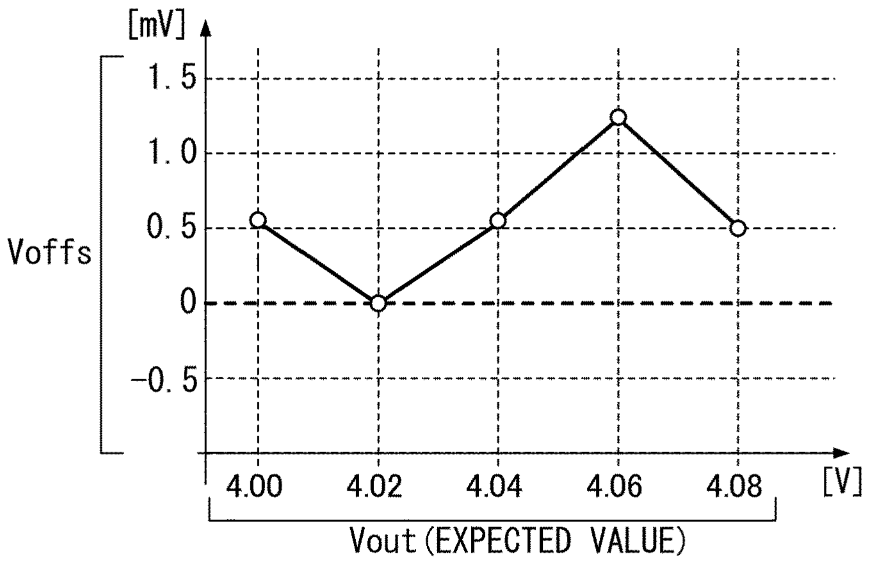
FIG. 6A is a diagram representing an example of an output error property when the digital-to-analog converter 100_2 is operated in the basic specification.
Figure 6B:
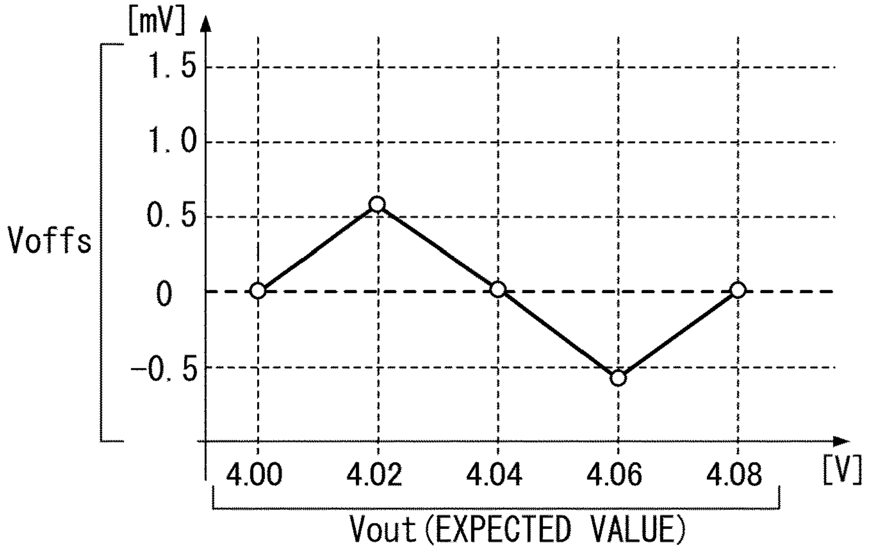
FIG. 6B is a diagram representing an example of the output error property by a correction value of the tail current ratio.
Figure 6C:
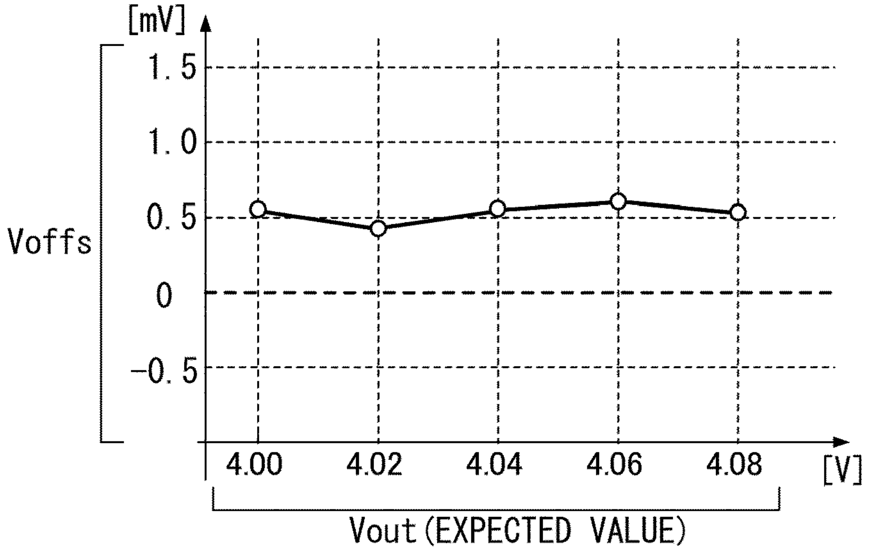
FIG. 6C is a diagram representing an example of the output error property when the digital-to-analog converter 100_2 is operated in the specification in which the correction of the tail current ratio is performed.

Here, FIG. 6A represents the output error property by the output error Voffs generated when the differential amplifier 10_2 is operated in accordance with the basic specification illustrated in FIG. 4A, and FIG. 6B represents the output error property by the output error Voffs generated by "0.06" added to the reference value "1" by the correction of the above-described tail current ratio. Further, FIG. 6C is a diagram representing the output error property by the output error Voffs generated when the differential amplifier 10_2 is operated in accordance with the specification after the correction illustrated in FIG. 4B.

That is, by the above-described correction of the tail current ratio, the output error in the opposite direction as illustrated in FIG. 6A is generated with respect to the output error property generated when the differential amplifier 10_2 is operated in the basic specification illustrated in FIG. 6B to offset the output error difference by the linear interpolation. In view of this, as illustrated in FIG. 6C, the width of the output error by the linear interpolation decreases to about plus or minus 0.2 millivolts.

Figure 7:
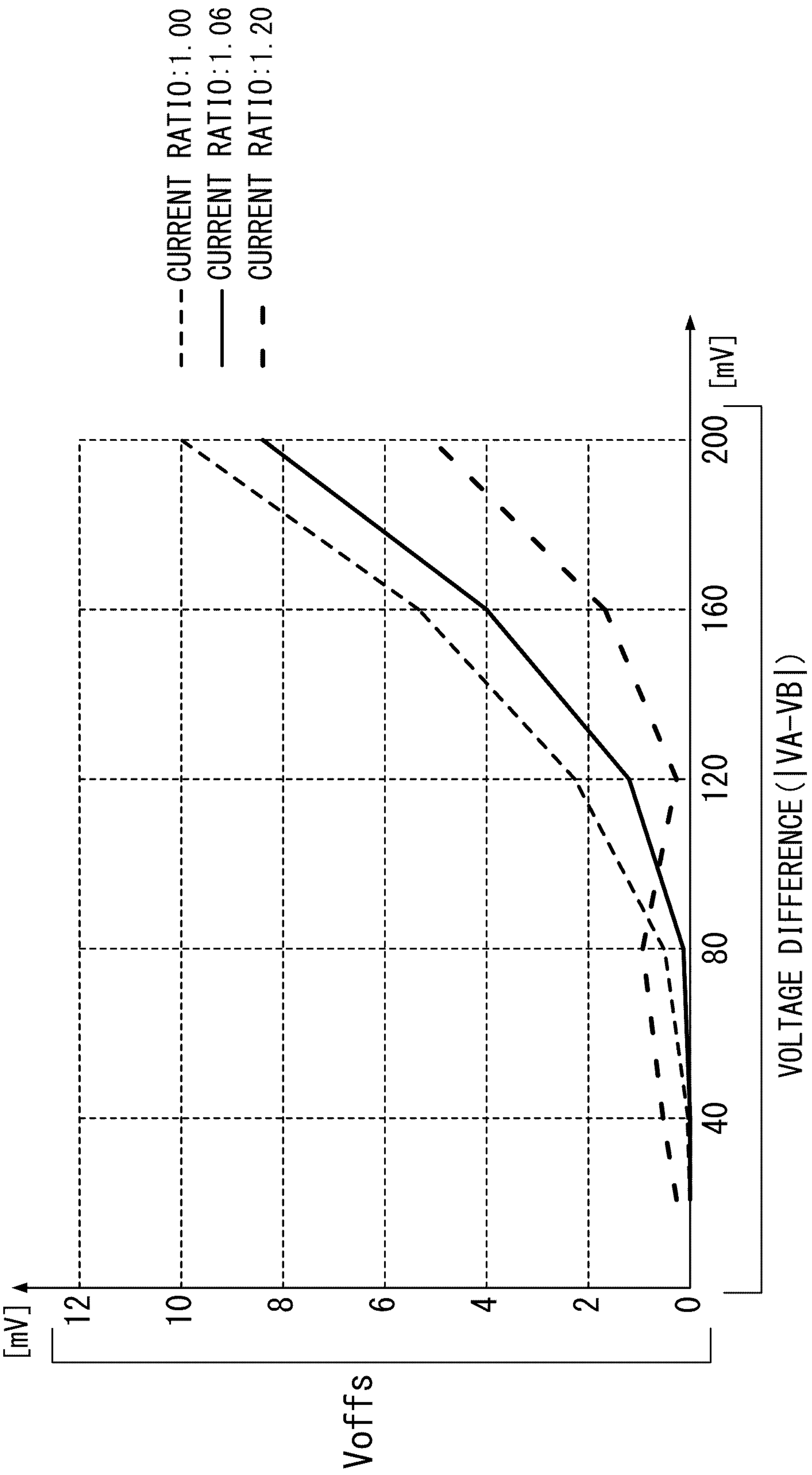
FIG. 7 is a diagram representing transition of the output error in the digital-to-analog converter 100_2 with respect to a voltage difference between voltages VA and VB at each of various tail current ratios (1.00, 1.06, 1.20)

FIG. 7 is a diagram representing the comparison of the output error properties between when the respective tail current ratios of the tail current ratios m<1> and m<4> are the reference value "1" (indicated by the dashed line), when corrected to "1.06" described above (indicated by the thick solid line), and corrected to "1.20" (a one dot chain line).

As illustrated in FIG. 7, when the respective tail current ratios of the tail current ratios m<1> and m<4> are "1" as the reference value, the larger the voltage difference (|VA−VB|) between the voltages VA and VB is, the more the output error becomes. On the other hand, when the tail current ratio is larger than "1," as illustrated in FIG. 7, even when the voltage difference between the voltages VA and VB increases, the amount of increase of the output error can be reduced. However, when the tail current ratio is excessively increased (for example, the tail current ratio: 1.20), in a case where the voltage difference between the voltages VA and VB is small (for example, 80 millivolts or less illustrated in FIG. 7), the output error increases. Therefore, based on the voltage difference between the voltages VA and VB actually employed, the optimal correction amount "α" with respect to the reference value "1" of the respective tail current ratios m<1> and m<4> is determined such that the output error falls within the allowable range.

Embodiment 3

FIG. 8A is a diagram illustrating a modification of the basic specification illustrated in FIG. 4A, and FIG. 8B is a diagram representing a specification in which the tail current ratio illustrated in the basic specification of FIG. 8A is corrected.

In the basic specification illustrated in FIG. 8A, the input voltage V<2> when the decoder 50_2 receives the digital code in which the bits D0 becomes the logical level 0 and the bit D1 becomes the logical level 1 is changed from 4 millivolts illustrated in FIG. 4A to 4.08 millivolts and the input voltage V<3> is changed from 4.08 millivolts to 4 millivolts. In view of this, in the basic specification illustrated in FIG. 8A, the input voltages V<3> and V<4> are communalized with respect to the basic specification illustrated in FIG. 4A.

Accordingly, while the decoder 50_2 when the basic specification illustrated in FIG. 4A is employed has a circuit configuration (not illustrated) in which the two voltages VA and VB are individually selected and output as the input voltages V<3> and V<4> by the 2-bit (D0, D1) digital data signal DT, the decoder 50_2 when the basic specification illustrated in FIG. 8A is employed has a configuration in which only any one of the input voltages V<3> and V<4> is selected and output and the selection voltage is supplied to the input terminals t<3> and t<4> of the differential amplifier 10_2 in common. Accordingly, the decoder 50_2 corresponding to the basic specification of FIG. 8A reduces the number of selection switches required for the circuit configuration.

Note that in the basic specification illustrated in FIG. 8A, other matters excluding the above-described changes are the same as the ones illustrated in FIG. 4A and FIG. 6A.

On the other hand, in the specification after correcting the tail current ratio illustrated in FIG. 8B, for the output error of the voltage level (the SIM value) of the output voltage signal Vout illustrated in FIG. 6A, the tail current ratios m<1> to m<4> based on the digital data signals DT are specified such that the output error in the opposite direction as illustrated in FIG. 6B occurs.

That is, when the specification illustrated in FIG. 8B is employed, the respective current sources 13_2 and 13_3 illustrated in FIG. 3 that generate the tail currents m<2>Io and m<3>Io are variable current sources. The tail current control circuit 13A individually controls the respective values of the tail current ratios m<2> and m<3> to "1.06" or the reference value "1" based on the digital data signals DT as illustrated in FIG. 8B. Note that the value of the tail current ratio m<1> is fixed to "1.06" and the tail current ratio m<4> value is fixed to the reference value "1."

In this respect, even when the specification after correcting the tail current ratio illustrated in FIG. 8B is employed, the output error property of the output error Voffs is approximately the same as the one in FIG. 6C.

Figure 9:
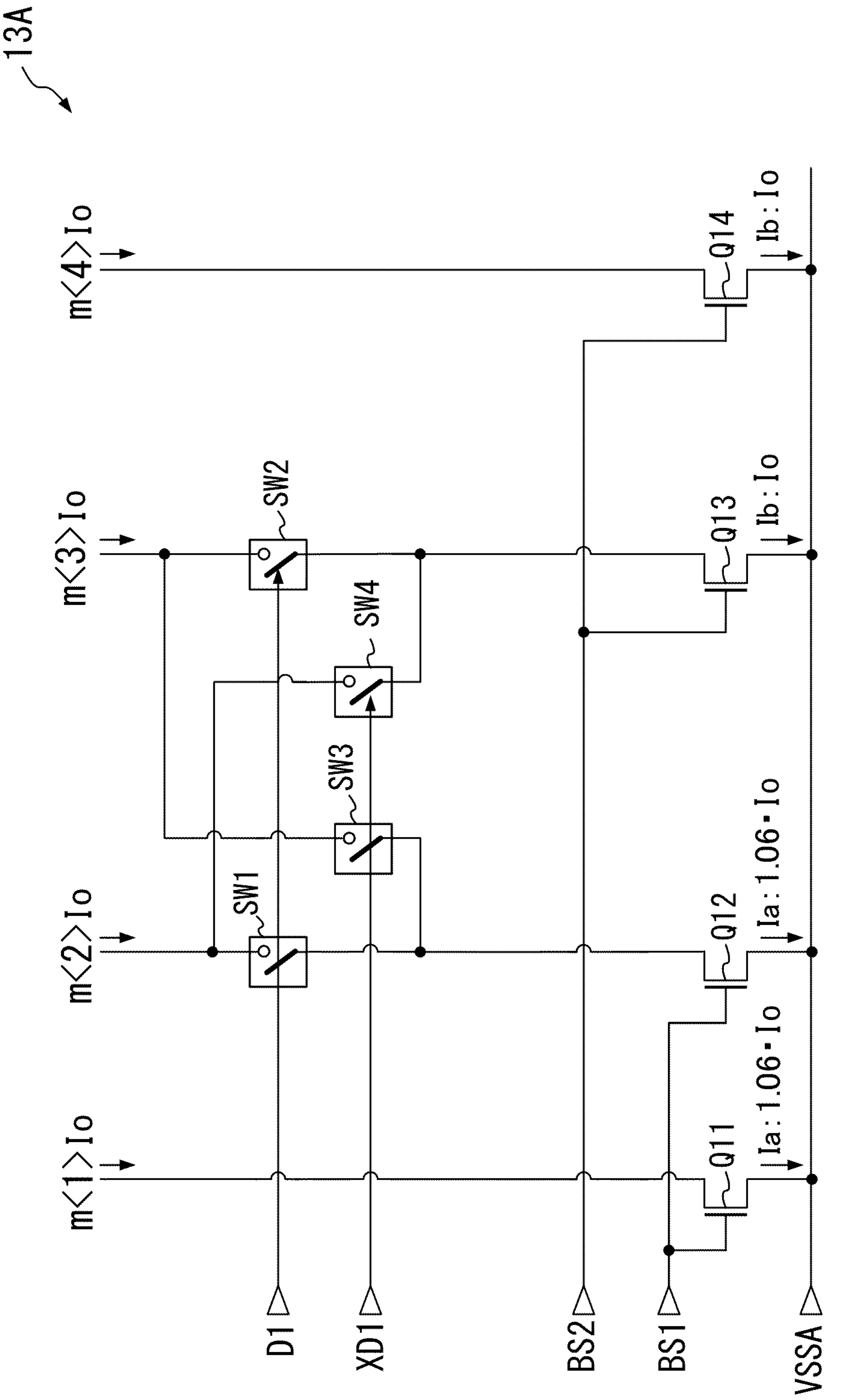
FIG. 9 is a circuit diagram illustrating another example of the tail current control circuit 13A.

FIG. 9 is a circuit diagram illustrating a specific circuit configuration of the tail current control circuit 13A included in the differential amplifier 10_2 when the specification illustrated in FIG. 8B is employed.

In the configuration illustrated in FIG. 9, the tail current control circuit 13A includes the N channel type current source transistors Q11 to Q14 and transistor switches SW1 to SW4.

The current source transistors Q11 and Q12 receive the bias voltage signal BS1 at the respective gates to generate the constant current Ia obtained by multiplying the reference current value Io by the tail current ratio "1.06." In this respect, the constant current Ia generated at the current source transistor Q11 directly flows to the differential pairs (11_1, 12_1) illustrated in FIG. 3 as the tail current m<1>Io. The current source transistors Q13 and Q14 receive the bias voltage signal BS2 by own gates to generate the constant current Ib obtained by multiplying the tail current ratio "1" by the reference current value Io. In this respect, the constant current Ib generated at the current source transistor Q14 directly flows to the differential pairs (11_4, 12_4) illustrated in FIG. 3 as the tail current m<4>Io.

The transistor switches SW1 and SW2 are on/off controlled according to the bit D1 of the digital data signal DT and the transistor switches SW3 and SW4 are on/off controlled according to an inversion bit XD1 of the bit D1. In this respect, based on the bit D1 of the digital data signal DT, when the transistor switches SW1 and SW2 are in the on state and the transistor switches SW3 and SW4 are in the off state, the constant current Ia generated at the current source transistor Q12 flows to the differential pair (11_2, 12_2) illustrated in FIG. 3 as the tail current m<2>Io. Further, in this respect, the constant current Ib generated at the current source transistor Q13 flows to the differential pair (11_3, 12_3) illustrated in FIG. 3 as the tail current m<3>Io. On the other hand, when the transistor switches SW1 and SW2 are in the off state and the transistor switches SW3 and SW4 are in the on state, the constant current Ia generated at the current source transistor Q12 flows to the differential pair (11_3, 12_3) as the tail current m<3>Io. Further, in this respect, the constant current Ib generated at the current source transistor Q13 flows to the differential pair (11_2, 12_2) as the tail current m<2>Io.

Thus, by selecting paths of the currents flowing through the respective current source transistors Q12 and Q13 by the transistor switches SW1 to SW4, the tail currents m<2>Io and m<3>Io are generated.

That is, by the specification illustrated in FIG. 8B, for each digital code of the digital data signal DT, change control is performed on the tail current ratios m<2> and m<3> to be two values of the reference value "1" or "1.06."

In this respect, in the specification illustrated in FIG. 8B, the differential pairs in which the tail current ratios are simultaneously set to "1.06" larger than the reference value "1" is 2, and one of them is the differential pair (11_1, 12_1) corresponding to the tail current ratio m<1>. Additionally, the other one of the two differential pairs in which the tail current ratio is simultaneously set to "1.06" is the differential pair (11_2, 12_2) corresponding to the tail current ratio m<2> or the differential pair (11_3, 12_3) corresponding to the tail current ratio m<3>.

Thus, in the other one among the above-described two differential pairs, based on the digital data signal DT, the tail current control circuit 13A switches to one differential pair among the differential pair (11_2, 12_2) or (11_3, 12_3) as the differential pair excluding the differential pair (11_1, 12_1) among the differential pairs (11_1, 12_1) to (11_4, 12_4).

Embodiment 4

Figure 10:
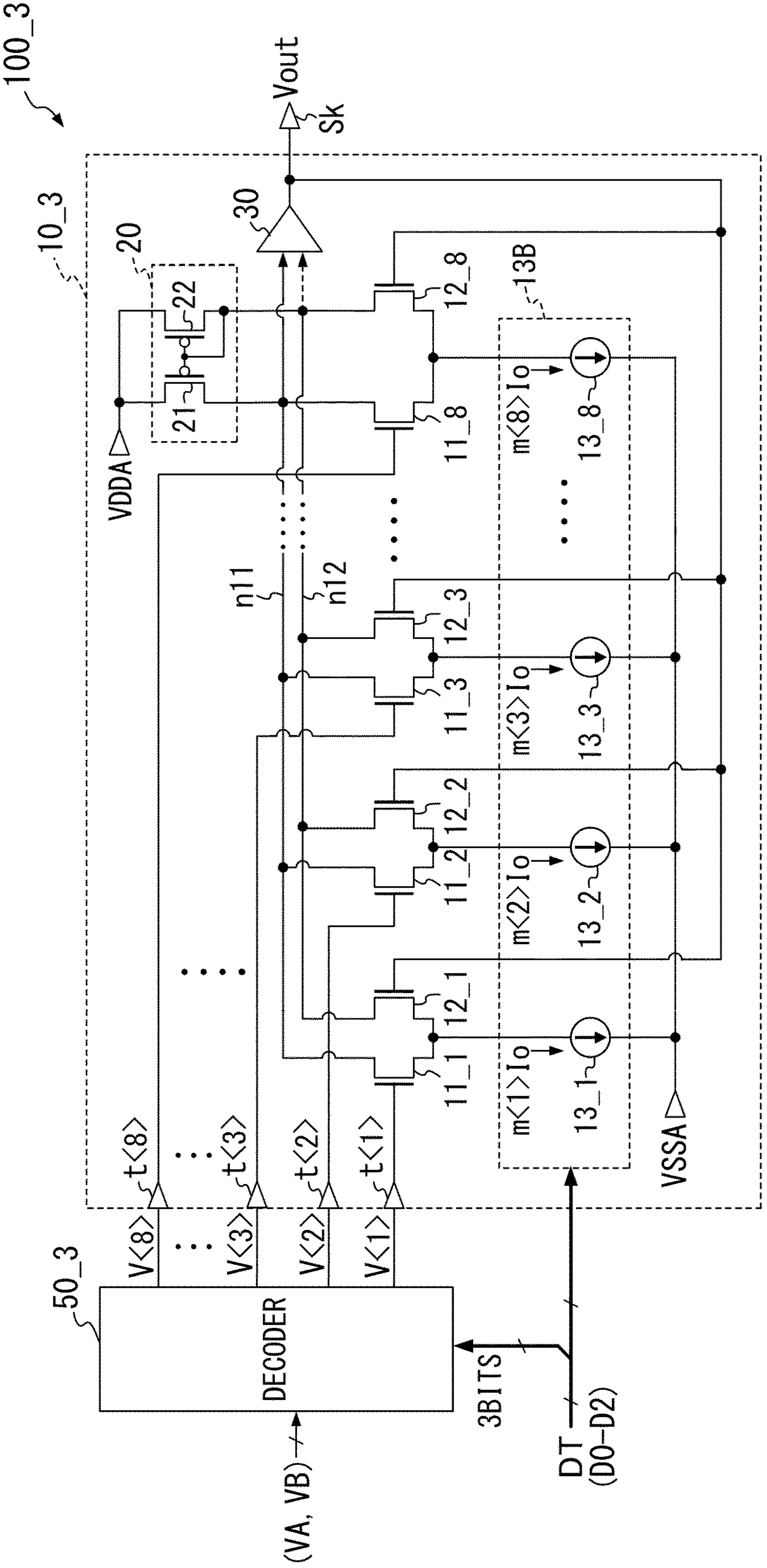
FIG. 10 is a circuit diagram illustrating a configuration of a digital-to-analog converter 100_3 of a third embodiment according to the disclosure.

FIG. 10 is a circuit diagram illustrating a configuration of a digital-to-analog converter 100_3 of the third embodiment according to the disclosure;

The digital-to-analog converter 100_3 receives the 3-bit digital data signal DT, converts it into the output voltage signal Vout, and outputs it. The digital-to-analog converter 100_3 includes a decoder 50_3 and a differential amplifier 10_3.

The decoder 50_3 receives the 3-bit (D0 to D2) digital data signal DT and the two voltages VA and VB formed of the voltage values different from one another. The decoder 50_3 selects the combination of assigning the two voltages VA and VB to respective input terminals t<1> to t<8> of the differential amplifier 10_3 based on the digital data signal DT. The decoder 50_3 supplies the input voltages V<1> to V<8> indicating one of the respective voltages VA and VB by the selected combination to the input terminals V<1> to V<8> as the non-inverting input terminals of the differential amplifier 10_3.

The differential amplifier 10_3 amplifies one voltage level corresponding to the 3-bit digital data signal DT among the eight voltage levels obtained by dividing between the voltages VA and VB by the linear interpolation, and outputs the amplification result as the output voltage signal Vout. The differential amplifier 10_3 includes eight respective differential pairs (11_1, 12_1) to (11_8, 12_8) of the same conductivity type (the N channel type in FIG. 10) to which tail current is supplied and having respective output pairs connected in common, a tail current control circuit 13B and, the current mirror circuit 20, and the amplification stage 30.

Note that in the digital-to-analog converter 100_3, the number of differential pairs included in the differential amplifier 10_1 of the digital-to-analog converter 100_1 illustrated in FIG. 1 is 8, that is, K=3, and the other configuration and the basic operation are the same as the digital-to-analog converter 100_1 described above, and therefore the description of the configuration and basic operation will be omitted.

The following will describe a specification of causing the digital-to-analog converter 100_3 to operate.

FIG. 11A is a diagram illustrating the basic specification of the digital-to-analog converter 100_3.

Note that FIG. 11A represents a relationship between the combination of the two respective voltages (VA, VB) assigned as the input voltages V<1> to V<8> supplied to the differential amplifier 10_3 by the decoder 50_3 based on the 3-bit (D0 to D2) digital data signals DT, the tail current ratios m<1> to m<8>, and the output voltage signals Vout. FIG. 11A illustrates a specification example in which the eight voltage levels excluding the voltage levels having the voltage VA among the nine voltage levels obtained by dividing between the voltages VA and VB into 8 are assigned for the respective 3-bit (D0 to D2) digital codes.

In the basic specification illustrated in FIG. 11A, the tail current ratios m<1> to m<8> corresponding to the respective differential pairs (11_1, 12_1) to (11_8, 12_8) are all set to the reference value "1." Further, the two voltages (VA, VB) received by the decoder 50_3 are set to the voltage levels (4.12 volts and 4.00 volts). Accordingly, as illustrated in FIG. 11A, the decoder 50_3 supplies the respective input voltages V<1> to V<8> having 4.12 or 4.00 volts to the differential amplifier 10_2 for each digital code of the 3-bit (D0 to D2) digital data signal DT.

Thus, the expected value of the output voltage signal Vout output from the differential amplifier 10_3 is represented by the following formula from the formula (10).

$$Vout=(m<1>V1+m<2>V2+, \ldots ,+m<8>V8)/(m<1>+m<2>+, \ldots ,+m<8>)$$

Accordingly, the expected value of the output voltage signal Vout for each digital code of the digital data signal DT when between the voltage levels 4.12 volts and 4.00 volts is divided into 8 by the linear interpolation is, as illustrated in FIG. 11A, as follows:

4.000 volts,
4.015 volts,
4.030 volts,
4.045 volts,
4.060 volts,
4.075 volts,
4.090 volts,
4.105 volts, and
4.120 volts.

The voltage level (the SIM value) of the output voltage signal Vout for each digital code of the digital data signal DT obtained when the differential amplifier 10_3 is actually operated using the input voltages V<1> to V<8> and the tail current ratios m<1> to m<8> illustrated in FIG. 11A is as follows:

4.0005 volts,
4.0133 volts,
4.0279 volts,
4.0439 volts,
4.0606 volts,
4.0775 volts,
4.0933 volts,
4.1077 volts, and
4.1205 volts.

Accordingly, as illustrated in FIG. 11A, the output error Voffs obtained by subtracting the expected value of the output voltage signal Vout from the voltage level (the SIM value) of the output voltage signal Vout to each of the expected values of the output voltage signal Vout is as follows:

0.0005 volts,
−0.0017 volts,
−0.0022 volts,
−0.0011 volts,
0.0006 volts,
0.0025 volts,
0.0033 volts,
0.0027 volts, and
0.0005 volts.

Note that 0.5 millivolts in the output error Voffs is the unique output error depending on the configuration of the differential amplifier and is uniquely included in the respective voltage levels of the output voltage signals Vout. Since the unique output error depending on the configuration of the differential amplifier differs from the output error by the linear interpolation of the two voltages (VA, VB), it is outside the target of correction described below.

That is, as illustrated in FIG. 11A, in the output voltage signal Vout, the output error Voffs of the width of the output error of about plus or minus 2.7 millivolts generated becomes larger or smaller than the respective expected values.

Therefore, in the tail current control circuit 13B, when the voltage level of the output voltage signal Vout becomes smaller (larger) than the expected value, the tail current ratios m<1> and m<8> are corrected such that the error occurs in a direction of the voltage level being larger (smaller) than the expected value.

FIG. 11B is a diagram illustrating an example of the specification of the digital-to-analog converter 100_3 in which the correction with the above-described correction value "α" is performed on the tail current ratios m<1> and m<8> of the reference value "1" illustrated in the basic specification of FIG. 11A. Note that, in the specification illustrated in FIG. 11B, the respective values of the input voltages V<1> to V<8> based on the digital data signals DT and the expected values of the output voltage signals Vout are the same as those illustrated in FIG. 11A.

In the specification illustrated in FIG. 11B, among the tail current ratios m<1> to m<8> corresponding to the respective differential pairs (11_1, 12_1) to (11_8, 12_8), only the respective values of the tail current ratios m<1> and m<8> are corrected to "1.2" obtained by adding "0.2" as "α" to the reference value "1."

Here, the voltage level (the SIM value) of the output voltage signal Vout for each digital code of the digital data signal DT obtained when the differential amplifier 10_3 is actually operated using the input voltages m<1> to m<8> and the input voltages V<1> to V<8> illustrated in FIG. 11B is as follows:

4.0005 volts,
4.0151 volts,
4.0292 volts,
4.0446 volts,
4.0606 volts,
4.0768 volts,
4.0920 volts,
4.1060 volts, and
4.1205 volts.

As a result, the output error Voffs obtained by subtracting the expected value of the output voltage signal Vout from the voltage level (the SIM value) of the output voltage signal Vout to each of the expected values of the output voltage signal Vout is, as illustrated in FIG. 11B, as follows:

0.0005 volts,
volts,
−0.0008 volts,
−0.0004 volts,
0.0006 volts,
0.0018 volts,
0.0020 volts,
0.0010 volts, and
0.0005 volts.

Figure 12A:
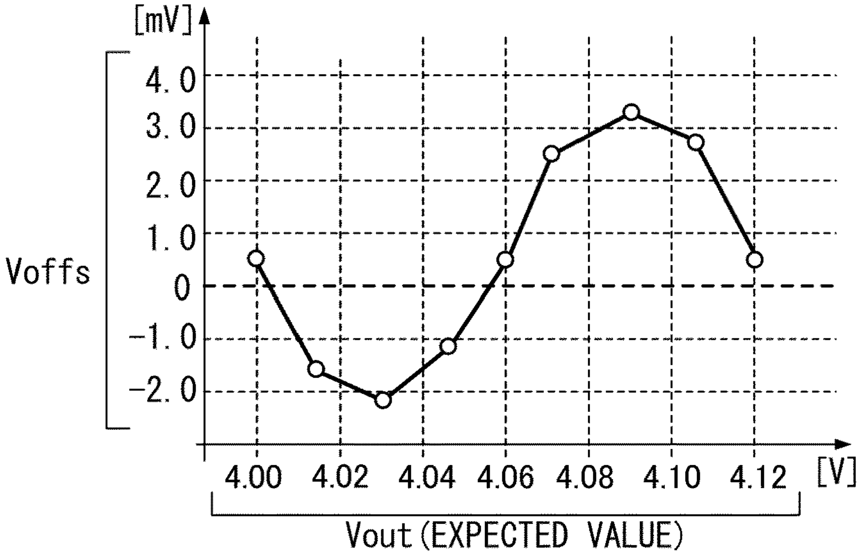
FIG. 12A is a diagram representing an example of the output error property when the digital-to-analog converter 100_3 is operated in the basic specification.
Figure 12B:
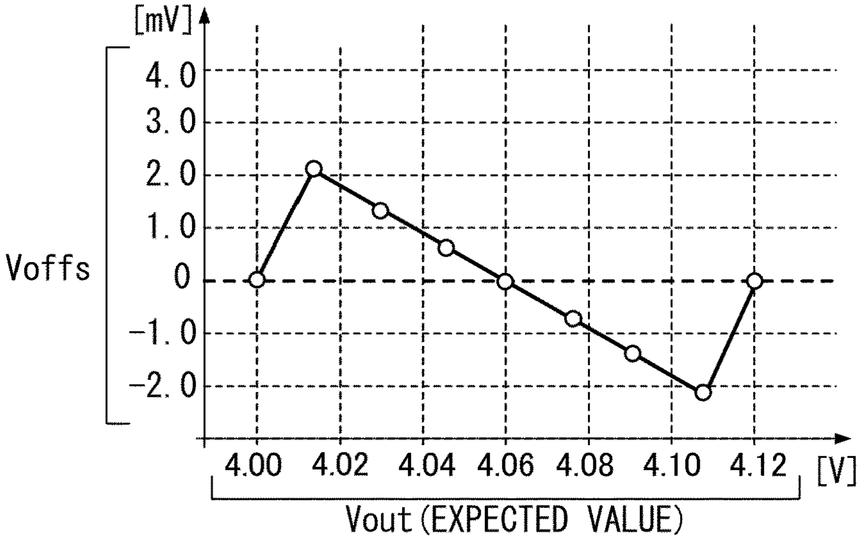
FIG. 12B is a diagram representing an example of the output error property by the correction value of the tail current ratio.
Figure 12C:
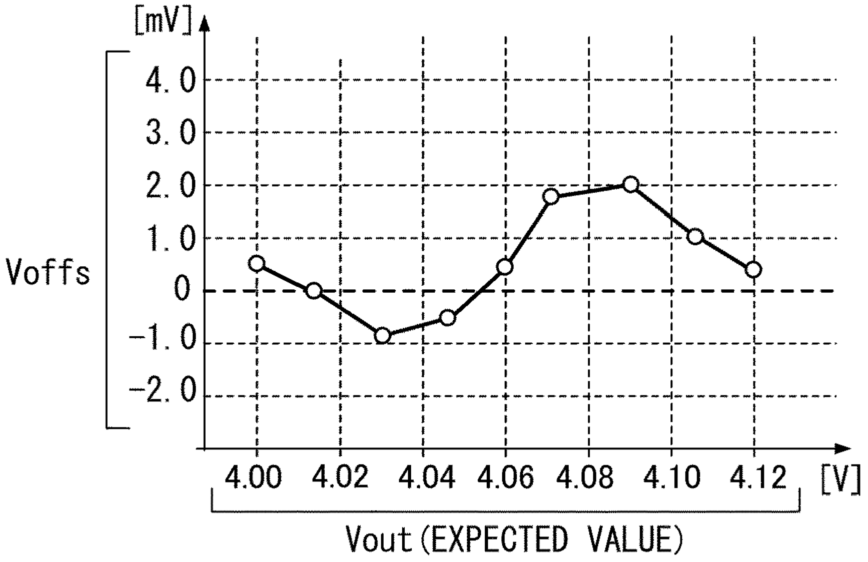
FIG. 12C is a diagram representing an example of the output error property when the digital-to-analog converter 100_3 is operated in the specification in which the correction of the tail current ratio is performed.

Here, FIG. 12A represents the output error property by the output error Voffs generated when the differential amplifier 10_3 is operated in accordance with the basic specification illustrated in FIG. 11A, and FIG. 12B represents the output error property by the output error Voffs generated by "0.2" added to the reference value "1" by the correction of the above-described tail current ratio. Further, FIG. 12C is a diagram representing the output error property by the output error Voffs generated when the differential amplifier 10_3 is operated in accordance with the specification after the correction illustrated in FIG. 11B.

That is, by the above-described correction of the tail current ratio, the output error in the opposite direction as illustrated in FIG. 12B is generated with respect to the output error property generated when the differential amplifier 10_3 is operated in the basic specification illustrated in FIG. 11A to offset the output error difference by the linear interpolation. In view of this, as illustrated in FIG. 12C, the width of the output error by the linear interpolation decreases to about plus or minus 1.5 millivolts.

Figure 13:
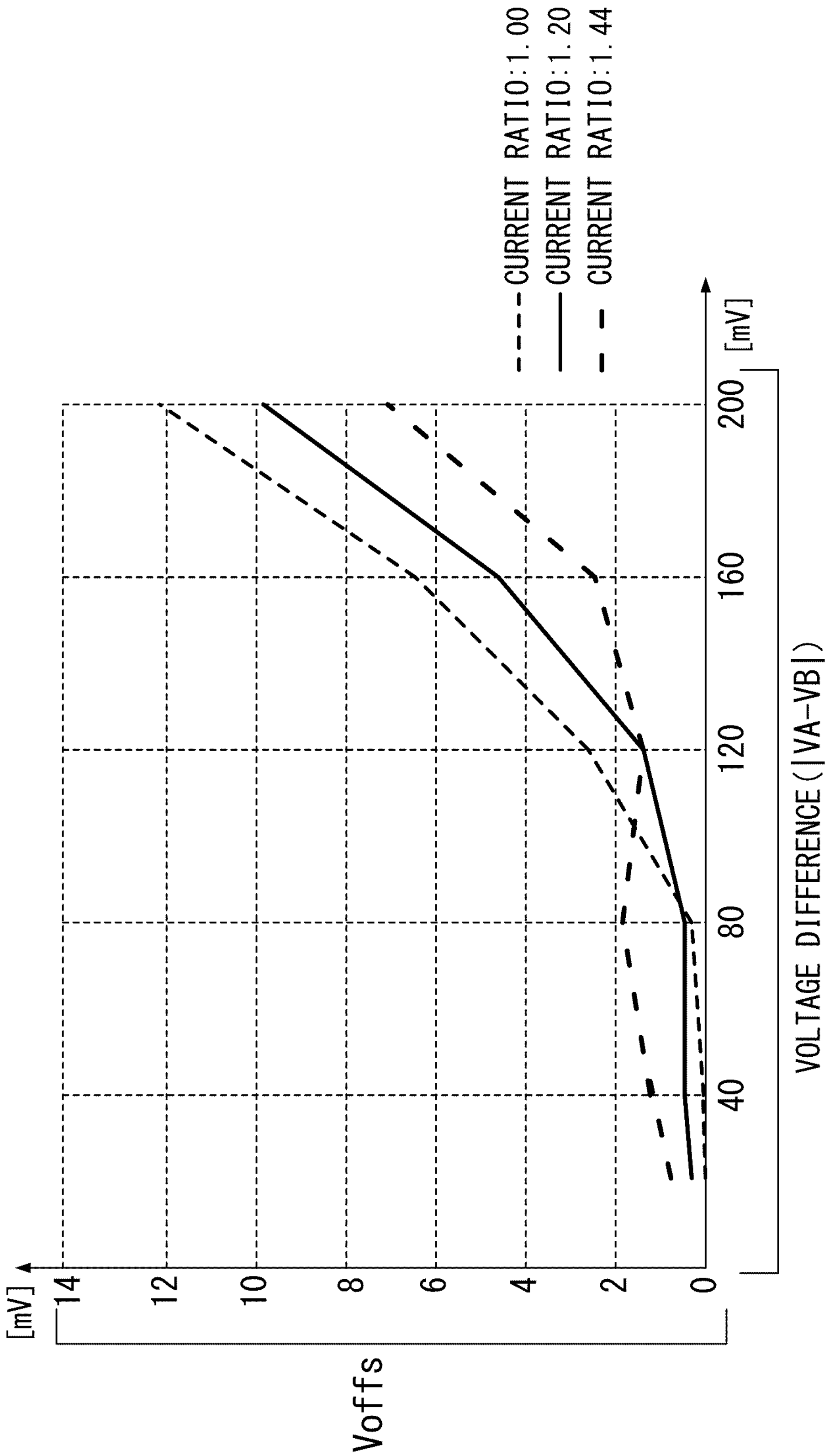
FIG. 13 is a diagram representing transition of the output error in the digital-to-analog converter 100_3 with respect to a voltage difference between voltages VA and VB at each of various tail current ratios (1.00, 1.20, 1.44)

FIG. 13 is a diagram representing the comparison of the output error properties between when the respective tail current ratios of the tail current ratios m<1> and m<8> are the reference value "1" (indicated by the dashed line), when corrected to "1.20" described above (indicated by the thick solid line), and corrected to "1.44" (a one dot chain line).

As illustrated in FIG. 13, when the respective tail current ratios of the tail current ratios m<1> and m<8> are "1" as the reference value, the larger the voltage difference (|VA−VB|) between the voltages VA and VB is, the more the output error becomes. On the other hand, when the tail current ratio is larger than "1," as illustrated in FIG. 13, even when the voltage difference between the voltages VA and VB increases, the amount of increase of the output error can be reduced. However, when the tail current ratio is excessively increased (for example, the tail current ratio: 1.44), in a case where the voltage difference between the voltages VA and VB is small (for example, 80 millivolts or less illustrated in FIG. 13), the output error increases. Therefore, based on the voltage difference between the voltages VA and VB actually employed, the optimal correction amount "α" with respect to the reference value "1" of the respective tail current ratios m<1> and m<8> is determined such that the output error falls within the allowable range.

Embodiment 5

FIG. 14A is a diagram illustrating a modification of the basic specification illustrated in FIG. 11A, and FIG. 14B is a diagram representing a specification in which the tail current ratio illustrated in the basic specification of FIG. 14A is corrected.

In the basic specification illustrated in FIG. 14A, the input voltage V<2> when the decoder 50_3 receives the digital code in which the bits D0 to D2 of the digital data signal DT become the logical level 0, 1, 0 or the logical level 0, 0, 1, or the logical level 0, 1, 1 is changed from 4 millivolts illustrated in the basic specification of FIG. 11A to 4.12 millivolts. In the basic specification illustrated in FIG. 14A, the input voltage V<4> when the decoder 50_3 receives the digital code in which the bits D0 to D2 of the digital data signal DT become the logical level 0, 1, 0 is changed from 4.12 millivolts illustrated in the basic specification of FIG. 11A to 4 millivolts. In the basic specification illustrated in FIG. 14A, the input voltage V<6> when the decoder 50_3 receives the digital code in which the bits D0 to D2 of the digital data signal DT become the logical level 0, 0, 1 is changed from 4.12 millivolts illustrated in the basic specification of FIG. 11A to 4 millivolts. Further, in the basic specification illustrated in FIG. 14A, the input voltage V<8> when the decoder 50_3 receives the digital code in which the bits D0 to D2 of the digital data signal DT become the logical level 0, 1, 1 is changed from 4.12 millivolts illustrated in the basic specification of FIG. 11A to 4 millivolts. In view of this, in the basic specification illustrated in FIG. 14A, the input voltages V<3> and V<4> are communalized, the input voltages V<5> and V<6> are communalized, and further the input voltages V<7> and V<8> are communalized with respect to the basic specification illustrated in FIG. 11A.

Accordingly, the decoder 50_3 when the basic specification illustrated in FIG. 11A is employed has a circuit configuration (not illustrated) that individually outputs the two voltages VA and VB to the input voltages V<3> to V<8> by the 3-bit (D0, D1, D2) digital data signals DT. On the other hand, the decoder 50_3 when the basic specification illustrated in FIG. 14A is employed has a configuration in which only any one of the input voltages V<3> and V<4> is selected and output, the selection voltage is supplied to the input terminals t<3> and t<4> of the differential amplifier 10_3 in common, and only any one of the input voltages V<5> and V<6> is selected and output, the selection voltage is supplied to the input terminals t<5> and t<6> of the differential amplifier 10_3 in common, and further only any one of the input voltages V<7> and V<8> is selected and output, and the selection voltage is supplied to the input terminals t<7> and t<8> of the differential amplifier 10_3 in common. Accordingly, the decoder 50_3 corresponding to the basic specification of FIG. 14A reduces the number of selection switches required for the circuit configuration.

Note that in the basic specification illustrated in FIG. 14A, other matters excluding the above-described changes are the same as the ones illustrated in FIG. 11A.

On the other hand, in the specification after correcting the tail current ratio illustrated in FIG. 14B, the tail current ratios m<1> to m<8> are controlled such that the output error in the opposite direction as illustrated in FIG. 12B occurs with respect to the output error of the voltage level (the SIM value) of the output voltage signal Vout illustrated in FIG. 12A.

That is, to employ the specification illustrated in FIG. 14B, the respective current sources 13_2 and 13_7 illustrated in FIG. 10 that generate the tail currents m<2>Io and m<7>Io are variable current sources. The tail current control circuit 13B illustrated in FIG. 10 individually controls the respective values of the tail current ratios m<2> and m<7> to "1.20" or the reference value "1" as illustrated in FIG. 14B based on the digital data signals DT. Note that the value of the tail current ratio m<1> is fixed to "1.20" and the tail current ratio m<8> value is fixed to the reference value "1."

In this respect, even when the specification after correcting the tail current ratio illustrated in FIG. 14B is employed, the output error property of the output error Voffs becomes approximately the same as the one in FIG. 12C.

Figure 15:
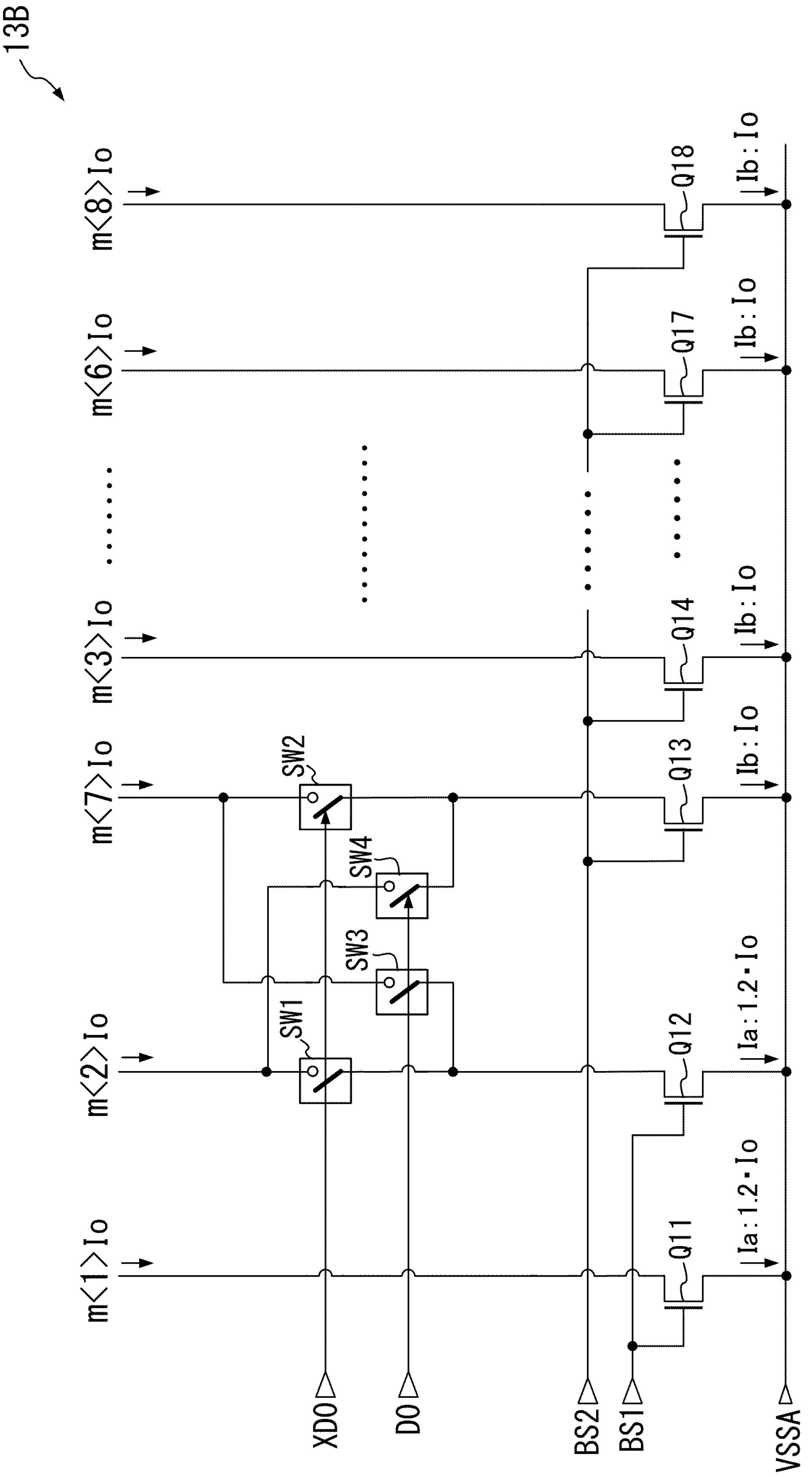
FIG. 15 is a circuit diagram illustrating an example of a tail current control circuit 13B.

FIG. 15 is a circuit diagram illustrating a specific circuit configuration of the tail current control circuit 13B included in the differential amplifier 10_3 when the specification illustrated in FIG. 15 and FIG. 14B is employed.

In the configuration illustrated in FIG. 15, the tail current control circuit 13B includes N channel type current source transistors Q11 to Q18 and the transistor switches SW1 to SW4.

The current source transistors Q11 and Q12 receive the bias voltage signal BS1 at the respective gates to generate the constant current Ia obtained by multiplying the reference current value Io by the tail current ratio "1.20." In this respect, the constant current Ia generated at the current source transistor Q11 directly flows to the differential pairs (11_1, 12_1) illustrated in FIG. 10 as the tail current m<1>Io.

Additionally, the current source transistors Q13 to Q18 receive the bias voltage signal BS2 at the respective gates to generate the constant current Ib obtained by multiplying the reference current value Io by the tail current ratio "1." In this respect, the constant current Ib generated by the respective current source transistors Q14 to Q18 directly flows to the respective differential pairs (11_3, 12_3) to (11_6, 12_6) and differential pair (11_8, 12_8) illustrated in FIG. 10 as the tail currents m<3>Io to m<6>Io and the tail current m<8>Io.

The transistor switches SW1 and SW2 are on/off controlled according to the inversion bit XD0 of the bit D0 of the digital data signal DT and the transistor switches SW3 and SW4 are on/off controlled according to the bit D0. In this respect, based on the bit D0 of the digital data signal DT, when the transistor switches SW1 and SW2 are in the on state and the transistor switches SW3 and SW4 are in the off state, the constant current Ia generated at the current source transistor Q12 flows to the differential pair (11_2, 12_2) illustrated in FIG. 10 as the tail current m<2>Io. Further, in this respect, the constant current Ib generated at the current source transistor Q13 flows to the differential pair (11_7, 12_7) illustrated in FIG. 10 as the tail current m<7>Io. On the other hand, when the transistor switches SW1 and SW2 are in the off state and the transistor switches SW3 and SW4 are in the on state, the constant current Ia generated at the current source transistor Q12 flows to the differential pair (11_7, 12_7) as the tail current m<7>Io. Further, in this respect, the constant current Ib generated at the current source transistor Q13 flows to the differential pair (11_2, 12_2) as the tail current m<2>Io.

Thus, by selecting the paths of the current flowing through the respective current source transistors Q12 and Q13 by the transistor switches SW1 to SW4, the tail currents m<2>Io and m<7>Io are generated.

That is, as illustrated in FIG. 14B, for each digital code of the digital data signal DT, change control is performed on the tail current ratios m<2> and m<7> to be two values of the reference value "1" or "1.20." Further, by the configuration illustrated in FIG. 15, the tail current ratio m<1> is controlled to "1.20" and the tail current ratios m<3> to m<6> and m<8> are controlled to the reference value "1."

Embodiment 6

FIG. 16 is a diagram illustrating another example of the specification of the digital-to-analog converter 100_3 in which the correction is performed on the tail current ratios m<1> and m<8> of the reference value "1" illustrated in the basic specification of FIG. 11A. Note that, in the specification illustrated in FIG. 16, the respective values of the input voltages V<1> to V<8> based on the digital data signals DT and the expected values of the output voltage signals Vout are the same as those illustrated in FIG. 11B.

In the specification illustrated in FIG. 16, the respective values of m<1> and m<8> among the tail current ratios m<1> to m<8> are switched to three stages of "1.2" obtained by adding "0.2" to the reference value "1," "1.4" obtained by adding "0.4" to the reference value "1," and "1.6" obtained by adding "0.6" to the reference value "1" based on the digital data signal DT.

Figure 17A:
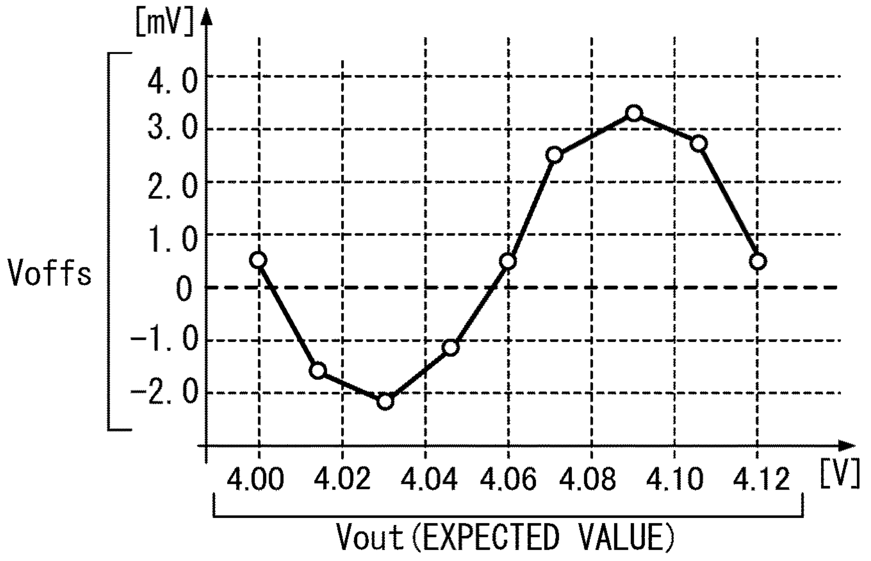
FIG. 17A is a diagram representing an example of the output error property when the digital-to-analog converter 100_3 is operated in the basic specification.
Figure 17B:
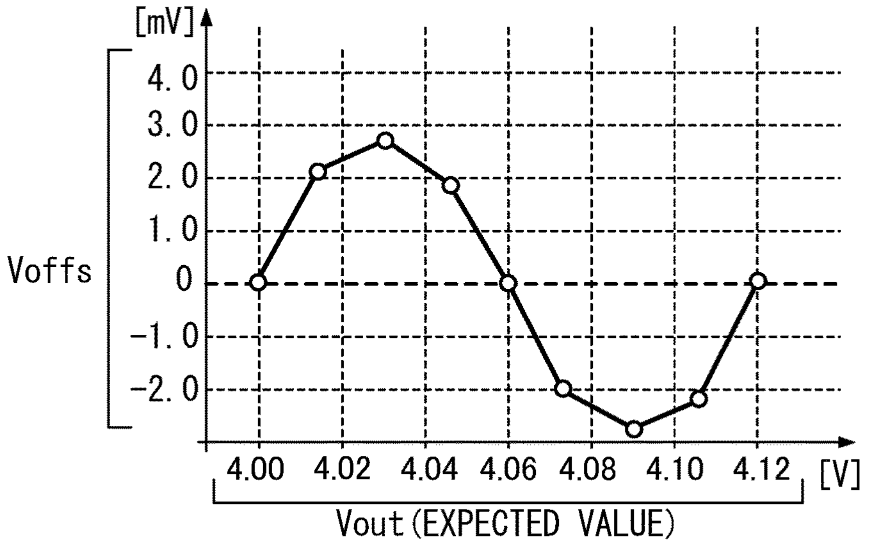
FIG. 17B is a diagram representing an example of the output error property by the correction value of the tail current ratio illustrated in FIG. 16.

Here, FIG. 17A represents an output error property to the expected value of the output error Voffs generated when the differential amplifier 10_3 is operated in accordance with the basic specification of FIG. 11A, and FIG. 17B represents the output error property by the output error Voffs generated at "0.2," "0.4," and "0.6" added to the reference value "1" of the respective tail current ratios m<1> and m<8> in the configuration illustrated in FIG. 16. Further, FIG. 17C is a diagram representing the output error property by the output error Voffs generated when the differential amplifier 10_3 is operated in accordance with the specification after correcting the tail current ratio illustrated in FIG. 16.

Figure 17C:
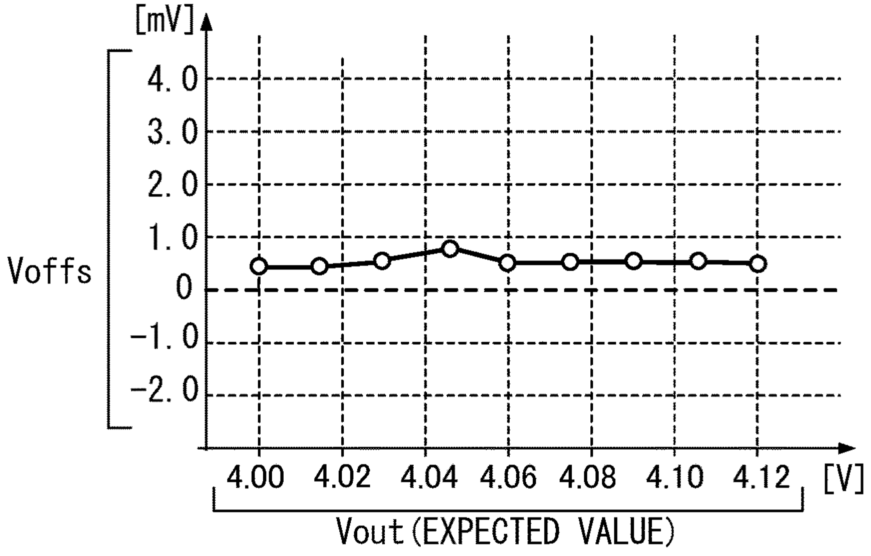
FIG. 17C is a diagram representing an example of the output error property when the digital-to-analog converter 100_3 is operated in the specification in which the correction of the tail current ratio is performed.

Thus, by operating the differential amplifier 10_3 in accordance with the specification illustrated in FIG. 16, as illustrated in FIG. 17C, a width of the output error becomes about plus or minus 0.2 millivolts. Accordingly, compared with the width of the output error of about plus or minus 1.5 millivolts when the differential amplifier 10_3 is operated in accordance with the specification illustrated in FIG. 11B (FIG. 12C), the output error can be substantially reduced.

Embodiment 7

Figure 18:
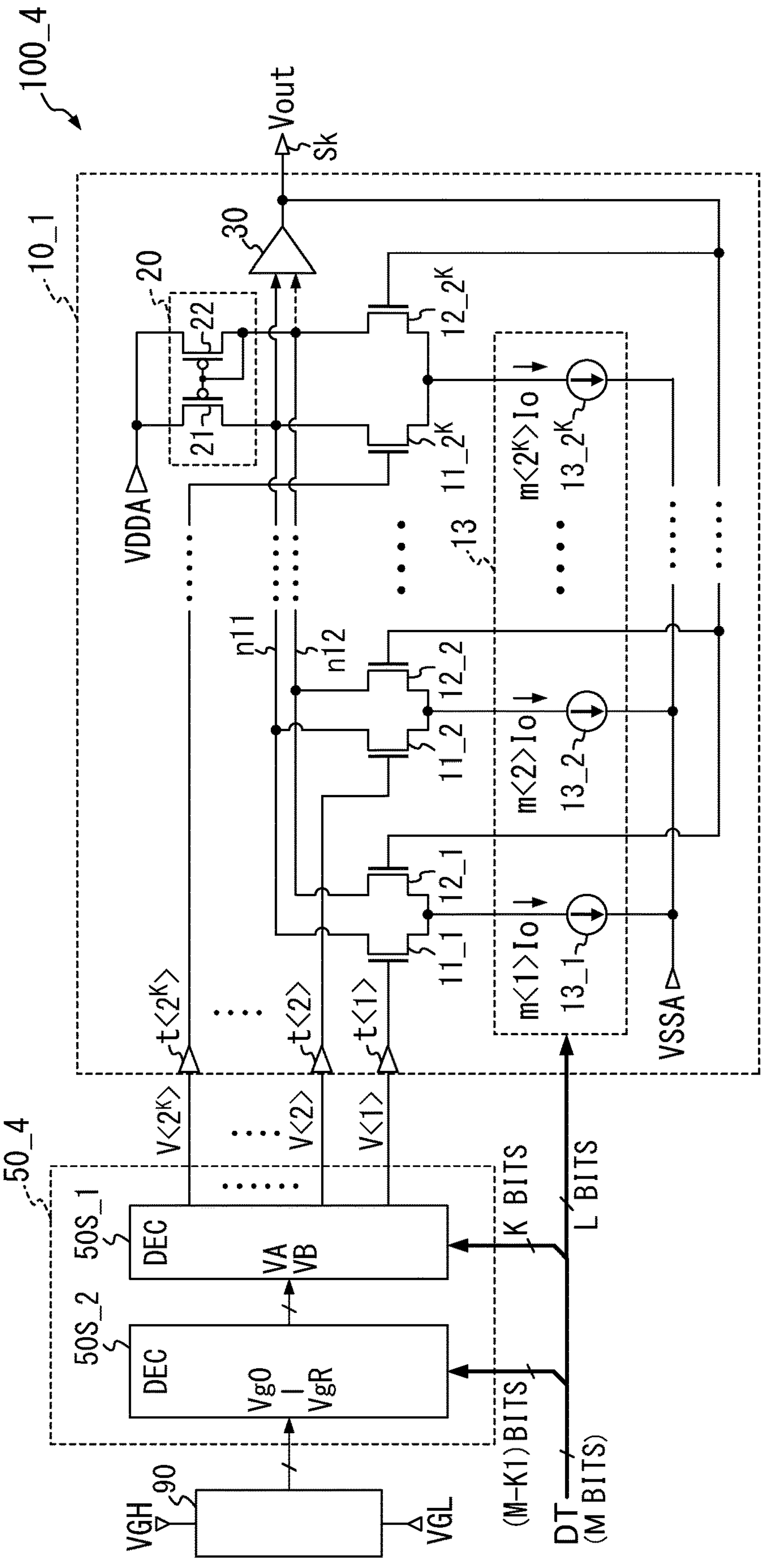
FIG. 18 is a circuit diagram illustrating a configuration of a digital-to-analog converter 100_4 as a fourth embodiment of the disclosure.

FIG. 18 is a circuit diagram illustrating a configuration of a digital-to-analog converter 100_4 as a fourth embodiment of the disclosure.

The digital-to-analog converter 100_4 expands the number of bits of the digital data signal DT as the conversion target to M (M is an integer larger than K) bits larger than K bits using the differential amplifier 10_1 including the Kth-power of 2 pieces of the differential pairs (11_1, 12_1) to (11_$2^K$, 12_$2^K$) illustrated in FIG. 1.

Note that the digital-to-analog converter 100_4 employs a decoder 50_4 instead of the decoder 50_1 illustrated in FIG. 1 and a reference voltage generation unit 90 and the configuration of the differential amplifier 10_1 is same as the one illustrated in FIG. 1.

The reference voltage generation unit 90 receives a direct-current reference power supply voltage VGH and a reference power supply voltage VGL having a voltage lower than the reference power supply voltage VGH. The reference voltage generation unit 90 generates respective reference voltages Vg0 to VgR (R is an integer of 2 or more) having different voltage values based on the reference power supply voltages VGH and VGL and supplies the reference voltages Vg0 to VgR to the decoder 50_4.

The decoder 50_4 includes sub decoders 50S_1 and 50S_2.

The sub decoder 50S_2 receives the M-bits digital data signals DT and the reference voltages Vg0 to VgR and selects a pair of the voltages adjacent to one another among the reference voltages Vg0 to VgR based on the high-order bits of the digital data signal DT, for example, the high-order (M-K) bits as the two voltages (VA, VB). The sub decoder 50S_2 supplies the selected two voltages (VA, VB) to the sub decoder 50S_1.

The sub decoder 50S_1 selects a combination that distributes one or the other of the voltages (VA, VB) to the respective input terminals t<1> to t<2> of the differential amplifiers 10_1 based on the low-order K bits of the digital data signal DT and the two voltages (VA, VB). The sub decoder 50S_1 supplies the voltage group in which the voltages (VA, VB) are distributed to the respective input terminals t<1> to t<$2^K$> to the input terminals t<1> to t<$2^K$> of the differential amplifiers 10_1 as the input voltages V<1> to V<2>. The operation of the differential amplifier 10_1 is the same as the one described using FIG. 2A and FIG. 2B described above.

FIG. 19 is a diagram illustrating an example of a specification of the digital-to-analog converter 100_4 illustrated in FIG. 18 when K=3. Note that the specification illustrated in FIG. 19 indicates two voltages (VA, VB) selected by the sub decoder 50S_2 based on the high-order side (M-K) bits of the M-bit digital data and a voltage level (an output level) output from the output terminal Sk by the actions of the sub decoder 50_2 and the differential amplifier 10_1 according to low-order K bits.

In the specification, the sub decoder 50S_2 selects the voltage levels of the two voltages (VA, VB) at every eight output levels, that is, (0, 8), (8, 16), (16, 24), . . . and the like based on the digital data signal DT of the high-order (M-K) bits. Thus, as the analog output voltage signal Vout, output levels 1 to 8, 9 to 16, 17 to 24, . . . can be obtained.

Embodiment 8

Figure 20:
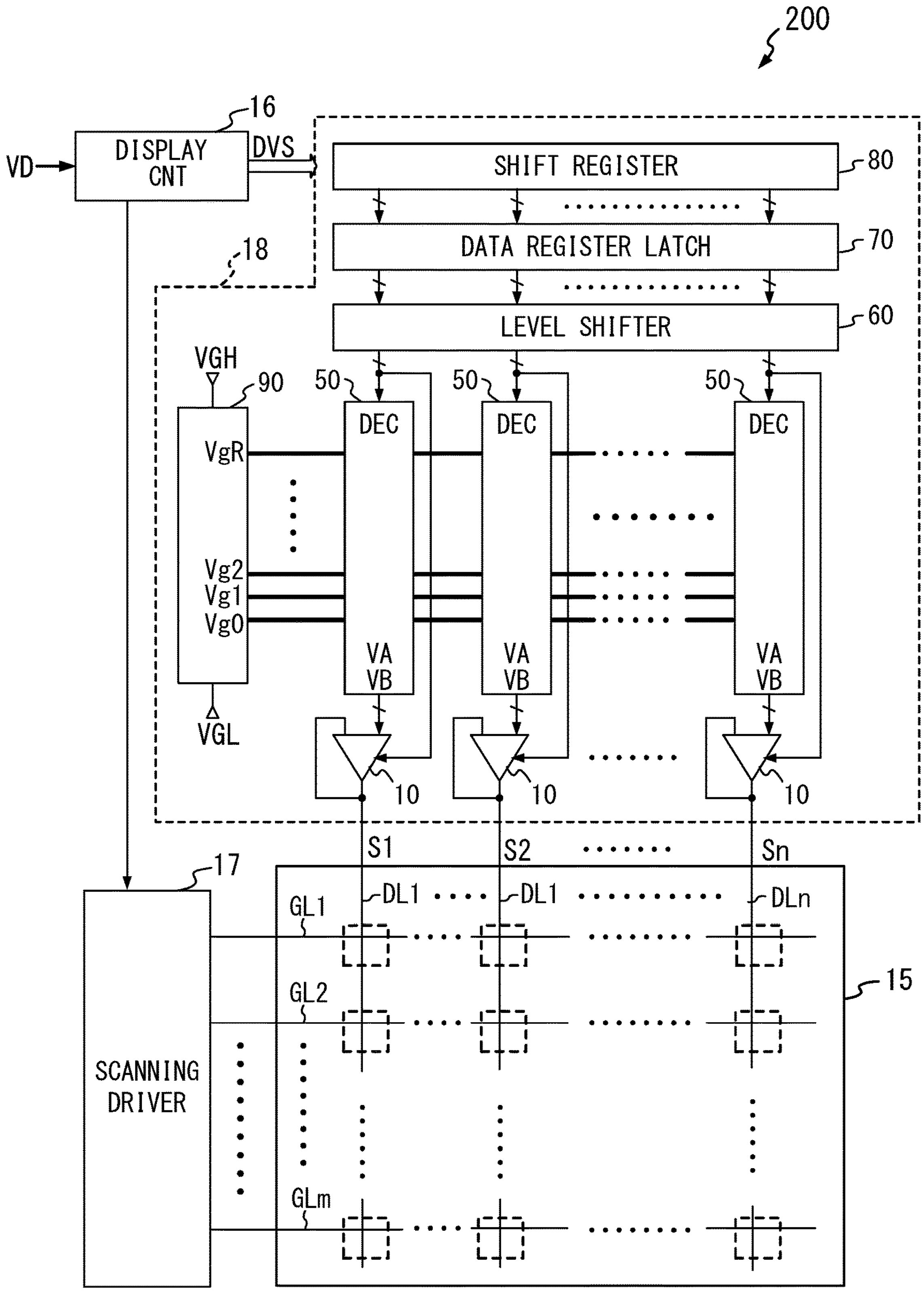
FIG. 20 is a block diagram illustrating a schematic configuration of a display device 200 including a data driver according to the disclosure.

FIG. 20 is a block diagram illustrating a configuration of a display device 200 including the data driver including the above-described digital-to-analog converters (100_1 to 100_4).

The display device 200 includes a display panel 15, a display controller 16, a scanning driver 17, and a data driver 18.

The display panel 15 is, for example, constituted of a liquid crystal, an organic EL panel, or the like, and includes m pieces (m is a natural number of 2 or more) of horizontal scanning lines GL1 to GLm extending in a horizontal direction of a two-dimensional screen and n pieces (n is a natural number of 2 or more) of data lines DL1 to DLn extending in a perpendicular direction of the two-dimensional screen. A display cell serving as a pixel is formed in each intersecting portion of the horizontal scanning line and the data line.

The display controller 16 generates various control signals, such as a start pulse, a clock signal, perpendicular and horizontal synchronization signals, and a video digital signal DVS including a series of video digital data pieces representing a luminance level of each pixel based on a video signal VD.

The display controller 16 generates a scanning timing signal corresponding to the above-described horizontal synchronization signal, supplies it to the scanning driver 17, and supplies the above-described video digital signal DVS to the data driver 18.

The scanning driver 17 sequentially applies the horizontal scanning pulse to the respective horizontal scanning lines GL1 to GLm of the display panel 15 based on the scanning timing signal supplied from the display controller 16.

The data driver 18 includes a shift register 80, a data register latch 70, a level shifter 60, the reference voltage generation unit 90, n pieces of the decoders 50, and n pieces of differential amplifiers 10.

The shift register 80 generates a plurality of latch timing signals for selecting a latch in synchronization with the clock signal according to the start pulse included in the video digital signal DVS and supplies them to the data register latch 70.

The data register latch 70 acquires the video digital data pieces included in video digital signal DVS by predetermined pieces (for example, n pieces) based on each of latch timing signals supplied from the shift register 80 and supplies the n pieces of the video digital data signals representing the respective video digital data pieces to the level shifter 60.

The level shifter 60 supplies the n pieces of the video digital data signals after the level shift obtained by performing level shift processing that increases the signal amplitude to each of the n pieces of the video digital data signals supplied from the data register latch 70 to the n pieces of the decoders 50 disposed corresponding to the n pieces of respective output channels of the data driver 18.

The reference voltage generation unit 90 receives the direct-current reference power supply voltage VGH and a reference power supply voltage VGL having a voltage lower than the reference power supply voltage VGH. The reference voltage generation unit 90 generates the respective reference voltages Vg0 to VgR having different voltage values based on the reference power supply voltages VGH and VGL and supplies them to the n pieces of the respective decoders 50.

Each of the decoders 50 selects a pair of reference voltages corresponding to the video digital data signal level-shifted by the level shifter 60 from the above-described reference voltage group. Each of the decoders 50 supplies the selected pair of the reference voltages as the two voltages (VA, VB) to the differential amplifiers 10 disposed corresponding to the n pieces of the respective output channels of the data driver 18.

The differential amplifier 10 generates the output voltage signal Vout having one of voltages of, for example, eight obtained by dividing between the input voltages VA and VB and outputs the output voltage signal Vout as a drive signal. In this respect, the n pieces of the drive signals output from the n pieces of the differential amplifiers 10 are supplied to the respective data lines DL1 to DLn of the display panel 15 as drive signals S1 to Sn.

Here, as the decoder 50, the differential amplifier 10, and the reference voltage generation unit 90 disposed for each of the output channels of the data drivers 18 illustrated in FIG. 20, the digital-to-analog converter 100_4 illustrated in FIG. 18 is applicable. This allows saving the area of the data driver 18.

As described above in detail, the disclosure employs one including the following differential amplifier and a first decoder as the output digital-to-analog converter that converts K-bit (K is a positive number of 1 or more) digital data into the analog output voltage (Vout) and outputs it.

The differential amplifiers (10_1 to 10_4) include a plurality of input terminals (t<1> to t<$2^K$>) and output the output voltage (Vout) having one voltage level corresponding to the K-bit digital data among the voltage level group obtained by dividing a voltage received at the respective input terminals into the Kth-power of 2 pieces by linear interpolation from own output terminals. The first decoders (50_1 to 50_4) receive the first and second voltages (VA, VB), and distribute and supply the first voltage (VA) or the second voltage (VB) to the respective plurality of input terminals of the differential amplifiers based on the K-bit digital data.

Here, the differential amplifier includes the following a Kth-power of 2 pieces of the differential pairs, amplification stage, and tail current control circuit.

The Kth-power of 2 pieces of the respective differential pairs (11_1, 12_1 to 11_2$^K$, 12_2$^K$) include inverting input terminals to which the output voltages (Vout) are input in common, non-inverting input terminals to which one of voltages (V<1> to V<$2^K$>) received at the plurality of input terminals is supplied as the input voltage, and output pairs. The output pairs of the Kth-power of 2 pieces of the differential pairs are connected in common, and each of them is driven by the individually received tail current (m<1>Io to m<$2^K$>Io).

The amplification stage (30) generates the output voltage (Vout) by the amplification action based on the output of one or both of the output pair of the Kth-power of 2 pieces of the respective differential pairs.

The tail current control circuits (13, 13A, 13B) individually supply the tail current to the Kth-power of 2 pieces of the respective differential pairs. In this respect, the tail current control circuit controls such that the current ratio to the reference current value (Io) in the tail current flowing through the respective differential pairs excluding two differential pairs among the Kth-power of 2 pieces of the differential pairs becomes a predetermined reference value (for example, "1") and the current ratio of the tail current flowing through the two respective differential pairs becomes larger than the reference value (for example, "1.06" or "1.2").

Thus, an output error (for example, FIG. 6B) in an opposite direction to an output error (for example, FIG. 6A) with respect to the expected value that occurs in the output voltage when all of the current ratios of the tail currents flowing through the respective differential pairs are unified to the reference value occurs, and the output error is offset (for example, FIG. 6C).

Accordingly, according to the disclosure, the output error generated in the analog output voltage of the digital-to-analog converter can be reduced.

It is understood that the foregoing description and accompanying drawings set forth the preferred embodiments of the disclosure at the present time. Various modifications, additions and alternative designs will, of course, become apparent to those skilled in the art in light of the foregoing teachings without departing from the spirit and scope of the disclosure. Thus, it should be appreciated that the disclosure is not limited to the disclosed Examples but may be practiced within the full scope of the appended claims.

What is claimed is:

1. A digital-to-analog converter that converts K-bit (K is a positive number of 2 or more) digital data into an analog output voltage and outputs the analog output voltage, comprising:

a differential amplifier that includes a plurality of input terminals and outputs the output voltage having one voltage level corresponding to the K-bit digital data among a voltage level group obtained by dividing a voltage received at the respective plurality of input terminals into a Kth-power of 2 pieces by linear interpolation from own output terminals; and a first decoder that receives a first voltage and a second voltage and distributes and supplies the first voltage or the second voltage to the respective plurality of input terminals of the differential amplifier based on the K-bit digital data, wherein the differential amplifier includes:

a Kth-power of 2 pieces of differential pairs each including an inverting input terminal to which the output voltage is input in common, a non-inverting input terminal to which one of voltages received at the plurality of input terminals is supplied as an input voltage, and an output pair, each of the output pairs being connected in common, the Kth-power of 2 pieces of respective differential pairs being driven by an individually received tail current;

an amplification stage that generates the output voltage by an amplification action based on an output of one or both of the output pair of each of the Kth-power of 2 pieces of the differential pairs; and a tail current control circuit that individually supplies the tail current to each of the Kth-power of 2 pieces of the differential pairs, wherein the tail current control circuit sets a current ratio to a reference current value in the tail current flowing through respective differential pairs excluding two differential pairs among the Kth-power of 2 pieces of the differential pairs as a predetermined reference value, and the current ratio of the tail current flowing through the two respective differential pairs is set to a value larger than the reference value.

2. The digital-to-analog converter according to claim 1, wherein the first decoder supplies one voltage among the first voltage and the second voltage to the non-inverting input terminal of one differential pair among the two differential pairs, and the first decoder supplies the other voltage among the first voltage and the second voltage to the non-inverting input terminal of the other differential pair among the two differential pairs.

3. The digital-to-analog converter according to claim 1, wherein the tail current control circuit sets the current ratio of the tail current flowing through the two respective differential pairs to a predetermined first value larger than the reference value.

4. The digital-to-analog converter according to claim 3, wherein the tail current control circuit fixes the current ratio of the tail current flowing through the two respective differential pairs to the first value regardless of the K-bit digital data.

5. The digital-to-analog converter according to claim 3, wherein the tail current control circuit switches the current ratio of the tail current flowing through the two respective differential pairs to the first value or a second value different from the first value based on the K-bit digital data.

6. The digital-to-analog converter according to claim 3, wherein the tail current control circuit switches from the other differential pair to one differential pair excluding the one differential pair among the Kth-power of 2 pieces of the differential pairs based on the K-bit digital data.

7. The digital-to-analog converter according to claim 3, wherein the first decoder supplies one voltage among the first voltage and the second voltage to the non-inverting input terminals of predetermined two differential pairs among the Kth-power of 2 pieces of the differential pairs in common regardless of the K-bit digital data.

8. The digital-to-analog converter according to claim 1, wherein each of the Kth-power of 2 pieces of the differential pairs is constituted of a transistor pair of a same conductivity type and having a same property, and the differential pairs are also transistor pairs of a same conductivity type and having a same property.

9. The digital-to-analog converter according to claim 1, further comprising:

a reference voltage generation unit that generates a plurality of reference voltages having different voltage values; and a second decoder that receives M (M is an integer larger than K+1)-bit digital data including the K-bit digital data and the plurality of reference voltages, selects two adjacent reference voltages among the plurality of reference voltages based on high-order side (M-K) bits of the M-bit digital data, and supplies the respective reference voltages to the first decoder as the first voltage and the second voltage.

10. A data driver comprising a plurality of the digital-to-analog converters according to claim 1, wherein the plurality of digital-to-analog converters convert each of video digital data pieces representing a luminance level of each pixel by a digital value into a respective plurality of the output voltages having analog voltage values and supply a respective plurality of drive signals having the plurality of output voltages to a plurality of data lines of a display panel.

11. A display device comprising:

a display panel that includes a respective plurality of data lines to which a plurality of display cells are connected; and a data driver including a plurality of the digital-to-analog converters according to claim 1, wherein the plurality of digital-to-analog converters convert each of video digital data pieces representing a luminance level of each pixel by a digital value into a respective plurality of the output voltages having analog voltage values and supply a respective plurality of drive signals having the plurality of output voltages to the plurality of data lines of the display panel.

* * * * *